United States Patent
Vinciarelli

(10) Patent No.: US 7,154,250 B2
(45) Date of Patent: Dec. 26, 2006

(54) BUCK-BOOST DC—DC SWITCHING POWER CONVERSION

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 0 days.

(21) Appl. No.: 10/885,827

(22) Filed: Jul. 6, 2004

(65) Prior Publication Data

US 2004/0239299 A1    Dec. 2, 2004

Related U.S. Application Data

(62) Division of application No. 10/214,859, filed on Aug. 8, 2002, now Pat. No. 6,788,033.

(51) Int. Cl.
    *G05F 1/10* (2006.01)
(52) U.S. Cl. .............. 323/240; 323/242; 323/239
(58) Field of Classification Search ............... 323/225, 323/232, 235, 259, 284, 301, 344; 363/17, 363/41, 98, 132
    See application file for complete search history.

(56) References Cited

U.S. PATENT DOCUMENTS

| | | | |
|---|---|---|---|
| 5,196,995 | A | 3/1993 | Gulczynski |
| 5,734,258 | A | 3/1998 | Esser |
| 5,745,351 | A | 4/1998 | Taurand |
| 5,933,331 | A | 8/1999 | Boldin et al. |
| 6,037,755 | A | 3/2000 | Mao et al. |
| 6,069,804 | A | 5/2000 | Ingman et al. |
| 6,141,227 | A * | 10/2000 | Sheikh et al. ............ 363/41 |
| 6,166,527 | A | 12/2000 | Dwelley et al. |
| 6,396,250 | B1 | 5/2002 | Bridge |
| 6,522,108 | B1 | 2/2003 | Prager et al. |
| 6,636,431 | B1 | 10/2003 | Seki et al. |

FOREIGN PATENT DOCUMENTS

| | | |
|---|---|---|
| EP | 1 211 791 | 6/2002 |
| WO | WO 02/101909 | 12/2002 |

OTHER PUBLICATIONS

Morrison, "A New Modulation Strategy for a Buck-Boost Input AC/DC Converter," IEEE Transactions on Power Electronics, vol. 16, No. 1, Jan. 2001, pp. 34-45.
Severns and Bloom, "Modem DC-To-DC Switchmode Power Converter Circuits," 1985, ISBN 0-42-21396-4, pp. 156-157, no month.
LTC3440, Micropower Synchronous Buck-Boost DC/DC Converter, integrated circuit manufactured by Linear Technology Corporation, Milpitas, CA, USA, Oct. 2001, pp. 12.
Vinciarelli, U.S. Appl. No. 10/264,327, "Factorized Power Architecture with Point of Load Sine Amplitude Converters," filed Oct. 1, 2002.

* cited by examiner

*Primary Examiner*—Jessica Han
(74) *Attorney, Agent, or Firm*—Fish & Richardson P.C.

(57) ABSTRACT

Apparatus operates at a power level within a range of power levels that includes a rated maximum power level of the apparatus. The apparatus includes circuit elements to deliver power at an output voltage to a load from a source at an input voltage using an inductor selectively connected between the source and the load during a power conversion cycle. The inductor conducts a current having an average positive value during the power conversion cycle. A first switching device is interposed between the source and a first terminal of the inductor. A second switching device is interposed between a second terminal of the inductor and the load. A switch controller turns ON the first switching device during a time interval within the power conversion cycle during which the current is negative.

41 Claims, 27 Drawing Sheets

| | INPUT PHASE | ZVS S3 | IN-OUT PHASE | ZVS S2 | FREEWHEEL PHASE | ZVS S4 | CLAMPED PHASE | ZVS S1 |
|---|---|---|---|---|---|---|---|---|
| S1 | ON | ON | ON | | | | | |
| S2 | | | | | ON | ON | ON | |
| S3 | | | ON | ON | ON | | | |
| S4 | ON | | | | | | ON | ON |

BUCK-BOOST DC—DC SWITCHING POWER CONVERSION

This application is a division of pending U.S. application Ser. No. 10/214,859, filed Aug. 8, 2002 U.S. Pat. No. 6,788,033 (incorporated herein by reference).

BACKGROUND

This description relates to buck-boost DC-DC switching power conversion, e.g., in converters for which the input operating voltage delivered to the converter may span a range of values extending below and above the magnitude of the DC voltage delivered at the output of the converter.

Electrical and electronic equipment and systems often require conversion of an input voltage to an output voltage, which may be higher or lower than or approximately the same as the input voltage. For example, in stationary or portable systems powered by a DC battery it is often necessary to maintain constancy of output voltages independently of the state of charge and voltage of the battery. As another example, in systems utilizing the new power distribution architecture described in Vinciarelli, U.S. patent application Ser. No. 10/006,481, "Factorized Power Architecture with Point of Load Sine Amplitude Converters", filed Jan. 31, 2002 (the '481 application) and incorporated in its entirety by reference, it may be necessary to pre-regulate the "factorized bus voltage" delivered by a pre-regulator module (or "PRM", as that term is used in the '481 application) to point-of-load voltage transformation modules (or "VTMs", as that term is defined in the '481 application) by stepping up or down voltage from an input source. As another example, in systems powered from an AC voltage source it is often necessary to draw power from the AC source with near unity power factor while delivering power at a DC output voltage which may be higher or lower than the instantaneous voltage of the AC line. In general, it would be desirable to flexibly achieve the appropriate step up or step down of a voltage with high conversion efficiency, high power density, and low noise.

Buck-boost converters are known in the art. The buck-boost converter 10, shown in FIG. 1A, for example, is described in Severns and Bloom, "Modern DC-to-DC Switchmode Power Conversion Circuits," 1985, ISBN 0-442-21396-4, pp. 156–157. In the converter of FIG. 1A the switches 2,3 are operated synchronously: switch 2 is in position "A" when switch 3 is in position "A" and vice versa. Energy delivered from the input source 6 is stored in inductor 4 when switch 2 and 3 are in the "A" position and energy is delivered from the inductor to the load 5 when switch 2 and 3 are in the "B" position. As also explained in Severns and Bloom, ibid., pp. 157–158, the converter of FIG. 1A may be reduced to a single switch buck-boost converter 12 of FIG. 1B, in which the output voltage, Vo, has a polarity inversion relative to the input source.

In both cases, owing to substantial losses in the inductor and switching elements, the converter architectures of FIG. 1A and FIG. 1B are inefficient relative to other architectures such as a buck converter or a boost converter which are only capable of, respectively, step-down or step-up of an input voltage. In fact, it has been tempting to conclude that the ability to provide both step-down and step-up of voltage within the same converter comes at a price in terms of reduced efficiency and power density.

This expectation has not been altered by more recent developments. A buck-boost converter incorporating four switches is described in an October 2001 datasheet for the LTC34401 "Micropower Synchronous Buck-Boost DC/DC Converter" integrated circuit manufactured by Linear Technology Corporation, Milpitas, Calif., USA. A simplified schematic of the converter circuit 14 is shown in FIG. 2. In the Figure the converter operates in a continuous conduction (i.e., the current in the inductor 23, $I_L$ is nonzero throughout the entire operating cycle). A switch controller 19 operates the four MOSFET switches 11, 13, 15, 17 in one of three modes: (1) in a buck mode, with switch 15 always closed and switch 17 always open, when the magnitude, Vin, of the input voltage source 6 is within a range of values which are greater than the voltage, Vo, delivered to the load; (2) in a boost mode, with switch 11 always closed and switch 13 always open, when the magnitude. Vin, of the input voltage source is within a range of values which are less the voltage, Vo. and (3) in a buck-boost mode, with a first pair of switches, 11 and 13, "phasing in" to achieve a minimum duty cycle for switch 13, as a second pair of switches, 15 and 17. "phases out" to reduce to zero the duty cycle of switch 17, as the magnitude, Vin. of the input voltage source traverses a range of values which bracket the value Vo. As such this "buck-boost" architecture merely bridges a transition from the boost architecture to the buck architecture, while incurring increased losses and an intermediate reduction of efficiency relative to boost and buck modes that it is bridging. Owing to continuous conduction in the inductor, in each of the three modes referenced above switching losses occur when certain switching elements are turned ON to carry current without the voltage across the switching element being reduced prior to turn ON. Even at light load where continuous conduction cannot be maintained with a finite value of inductor 23, a lossy damper circuit, comprising switch 16 and "anti-ring" resistor 18, is included to dissipate energy stored in the parasitic capacitances of the inductor and the switches.

Clamp circuitry for preventing oscillatory noise in switching power converters by using a switch to trap energy in an inductive element and release it to reduce switching losses is described in Vinciarelli et al, U.S. patent application Ser. No. 09/834,750, "Loss and Noise Reduction in Power Converters", Apr. 13, 2001 (the "'750 application"), assigned to the same assignee as this application and incorporated in its entirety by reference.

SUMMARY

In general, in one aspect, the invention features apparatus to operate at a power level within a range of power levels that includes a rated maximum power level of the apparatus. The apparatus includes circuit elements to deliver power at an output voltage to a load from a source at an input voltage using an inductor selectively connected between the source and the load during a power conversion cycle. The inductor conducts a current having an average positive value during the power conversion cycle. A first switching device is interposed between the source and a first terminal of the inductor. A second so its, hinge device is interposed between a second terminal of the inductor and the load and a switch controller to turn ON the first switching device during a time interval within the power conversion cycle during which the current is negative.

Implementations of the invention may include one or more of the following features. The input voltage is within a range of input voltages that is less than the output voltage. The input voltage is within a range of input voltages that is greater than the output voltage. The input voltage is within a range of input voltages that includes the output voltage.

The first switching device is turned ON at a time when the voltage across the first switching device is less than the input voltage. The first switching device is turned ON at a time when the voltage across the first switching device is essentially zero. The apparatus of claim also includes a third switching device interposed between ground and the first, terminal of the inductor, the switch controller controlling the opening and closing of the third switching device. The third switching device is turned ON at a time when the voltage across the third switching device is less than the input voltage. The second switching device comprises a rectifier. The second switching device is turned ON at a time when the voltage across the second switching device is less than the output voltage. The apparatus also includes a fourth switching device interposed between ground and the second terminal of the inductor, the switch controller controlling the opening and closing of the fourth switching device. The fourth switching device is turned ON at a time when the voltage across the fourth switching device is less than the output voltage. The fourth switching device is turned ON at a time when the voltage across the fourth switching device is essentially zero. The switching devices comprise MOSFETs.

The power conversion cycle includes phases. The duration of at least one of the phases is controlled as a function of load. The duration of at least one of the phases is controlled as a function of a difference in magnitude between the input voltage and the output voltage and the maximum duration of the power conversion cycle is constrained to limit the minimum frequency of a succession of the power conversion cycles. The duration of the power conversion cycle increases as the power level decreases. The minimum and maximum durations of the power conversion cycle are constrained to limit the maximum and minimum frequencies of a succession of the power conversion cycles. The phases comprise a clamped phase. The duration of the clamped phase is minimized at the rated maximum power level. The phases comprise an in-out phase. The duration of the in-out phase increases as the magnitude of the difference between the input voltage and the output voltage decreases and the maximum duration of the power conversion cycle is constrained to limit the minimum frequency of a succession of the power conversion cycles. The phases comprise a free-wheel phase. The phases comprise an input phase. The duration of the input phase decreases as the input voltage increases. The duration of the input phase increases as the load increases. The power conversion cycle uses the same sequence of phases regardless of whether the input voltage is above, below, or the same as the output voltage. The apparatus has a power density greater than 200 Watts/cubic inch. The apparatus has a conversion efficiency greater than 97% at an operating condition within the range of power levels. The apparatus has a conversion efficiency greater than 97% when the input voltage level is within 10% of the output voltage level at the rated maximum power level.

In general, in another aspect, the invention features a method that includes delivering average power within a range of power levels including a maximum power level from a source at an input voltage to a load at an output voltage, selectively connecting an inductor to deliver the average power from the source to the load during a power conversion cycle, the average power flowing from the inductor through a second switching device to the load, and closing a first switching device that is interposed between the source and the inductor during a time interval within the power conversion cycle during which power flows from the inductor through the first switching device back to the source.

In general, in another aspect, the invention features, a method comprising converting power for delivery to a load at an output voltage from a source at an input voltage that can be higher or lower than the output voltage, the power being converted in a switching converter having a power density of at least 200 Watts per cubic inch by storing energy in an inductor operating in a discontinuous mode, with switching occurring at zero voltage.

In general, in another aspect, the invention features apparatus comprising a buck-boost converter to operate at a power level within a range of power levels including a rated maximum power level of the apparatus, and a DC transformer to deliver an output voltage to a load, the buck-boost converter comprising circuit elements to deliver power to the DC transformer from a source at an input voltage using an inductor selectively connected between the source and the DC transformer during a power conversion cycle, the inductor conducting a current having an average positive value during the power conversion cycle, a first switching device interposed between the source and a first terminal of the inductor, a second switching device interposed between a second terminal of the inductor and the DC transformer, and a switch controller to turn ON the first switching device during a time interval within the power conversion cycle during which the current in the inductor is negative.

Implementations of the invention may include one or more of the following features. The DC transformer is incorporated in a VTM, the buck-boost converter is incorporated in a PRM, and power is delivered from the PRM to the VTM by a factorized bus. The output voltage of the DC transformer is connected in a feedback configuration to control an operating condition of the buck-boost converter.

In general, in another aspect, the invention features apparatus to operate at a power level within a range of power levels including a rated maximum power level of the apparatus. The apparatus includes circuit elements to deliver power at an output voltage to a load from a source at an input voltage by selectively connecting an external inductor between the source and the load during a power conversion cycle. The inductor conducts a current having an average positive value during the power conversion cycle. A first switching device is coupled to the source and has a port to connect to a first terminal of the inductor. A second switching device is coupled to the load and has a port to connect to a second terminal of the inductor. A switch controller turns ON the first switching device during a time interval within the power conversion cycle during which the current is negative.

Implementations of the invention may include one or more of the following features. The apparatus also includes the inductor. The apparatus comprises an integrated semiconductor device.

In general, in one aspect, the invention features apparatus comprising (a) a buck-boost power converter to operate at a power level within a range of power levels including a rated maximum power level of the apparatus, the buck-boost converter comprising circuit elements to deliver power to a load at an output voltage from an AC source at an input voltage using an inductor selectively connected between the source and the load during a power conversion cycle, the inductor conducting a current having an average positive value during the power conversion cycle, (b) a first switching device interposed between the source and a first terminal of the inductor, (c) a second switching device interposed between a second terminal of the inductor and the load, (d) a switch controller to turn ON the first switching device during a time interval within the power conversion cycle during which the current is negative, and (e) a power factor controller connected to the switch controller to cause the switch controller to control the harmonic content of an input current from the AC source while regulating the output voltage.

Implementations of the invention may include one or more of the following features. The power factor controller receives an input current of the AC source and the output voltage as input signals.

In general, in another aspect, the invention features apparatus comprising (a) a battery, and (b) a power converter connected between the battery and a load to operate at a power level within a range of power levels including a rated maximum power level of the apparatus, the power converter comprising (c) circuit elements to deliver power at an output voltage to the load from the battery at an input voltage using an inductor selectively connected between the battery and the load during a power conversion cycle, the inductor conducting a current having an average positive value during the power conversion cycle, (d) a first switching device interposed between the battery and a first terminal of the inductor, (e) a second switching device interposed between a second terminal of the inductor and the load, and (f) a switch controller to turn ON the first switching device during a time interval within the power conversion cycle during which the current is negative.

In general, in another aspect, the invention features apparatus comprising a buck-boost power converter including (a) a first port to connect to terminals of a device across which a voltage may vary in response to current transients, (b) a second port to connect to a device that stores and releases energy, (c) an inductor to transfer energy between the first port and the second port, the first port and the second port serving selectively as either a source and a load or as a load and a source, (d) switching devices to selectively connect the inductor between any two of the source, the load, and a ground, (e) a switch controller to turn the switches ON and OFF in a sequence to cause power to be converted from the source to the load in either a buck mode or a boost mode, and (d) a port to receive a control input that controls whether the first port and the second port are serving respectively as either the source and the load or as the load and the source.

Implementations of the invention may include one or more of the following features. The apparatus also includes the device that stores and releases energy, e.g., a capacitor.

In general, in another aspect, the invention features apparatus comprising (a) circuit elements to deliver power at an output voltage to a load from a source at an input voltage using an inductor selectively connected between the source and the load during a power conversion cycle, the inductor conducting a current having an average positive value during the power conversion cycle, (b) a first switching device interposed between the source and a first terminal of the inductor, (c) a second switching device interposed between a second terminal of the inductor and the load, (d) a switch controller to turn ON the first switching device during a time interval within the power conversion cycle during which the current is negative, (e) a first port to connect to terminals of an operating device across which a voltage may vary in response to current transients, (f) a second port to connect to a storage device that stores and releases energy, the operating device and the storage device serving selectively either as a source and a load or as a load and a source and (g) a port to receive a control input that controls whether the first port and the second port are serving respectively as either the source and the load or as the load and the source.

In general, in another aspect, the invention features apparatus adapted to share power within a range of power levels that includes a rated maximum power level of the apparatus, the apparatus comprising (a) circuit elements to deliver power at an output voltage to a load from a source at an input voltage using an inductor selectively connected between the source and the load during a power conversion cycle of a succession of power conversion cycles, the inductor conducting a current having an average positive value during the power conversion cycle and having a negative value during a time interval within the power conversion cycle, (b) a paralleling port to emit or receive from a paralleling bus a paralleling pulse in a succession of paralleling pulses, and (c) a control circuit to synchronize the succession of power conversion cycles to the succession of paralleling pulses.

Implementations of the invention may include the following feature. The paralleling pulse has a rising edge, a falling edge and a pulse width and the control circuit adjusts parameters of the power conversion cycle to parameters of the paralleling pulse.

Other advantages and features will become apparent from the following description and from the claims.

DESCRIPTION

We first briefly describe the drawings.

Figure 1A:
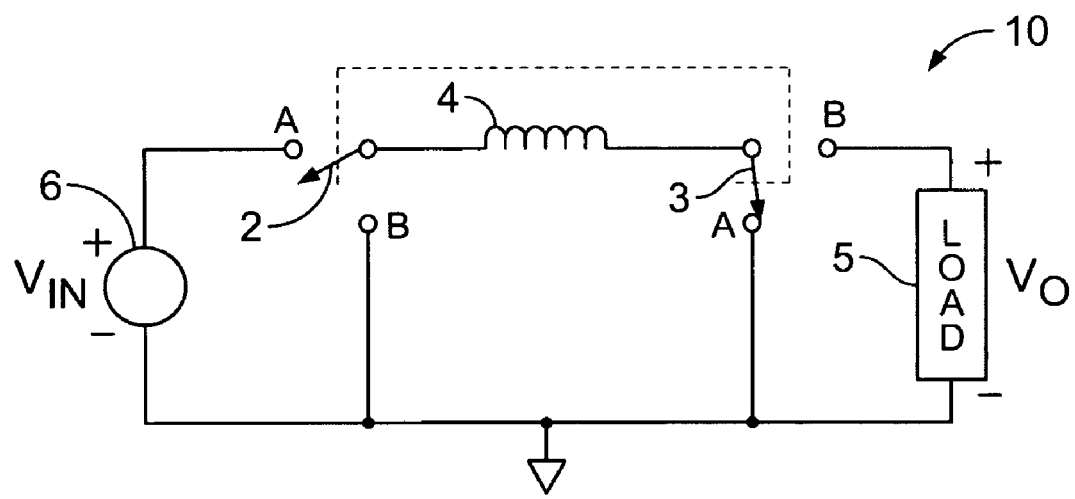
FIGS. 1A and 1B show buck-boost converter topologies.

In the buck-boost converter of FIG. 1A the inductor 4 is either connected directly across the input source (switches 2 and 3 in "A" position) or directly across the load switches 2 and 3 in "B" position). In buck mode (i.e., the operating mode in which the input source 6 voltage, Vin, is converted to a lower value of output voltage, Vout), the switches 2,3 are controlled to spend a relatively longer period of time in the "B" position Than in the "A" position; in boost mode (i.e., the operating mode in which the input source 6 voltage, Vin, is converted to a higher value of output voltage, Vout), the switches 2,3 spend a relatively longer period of time in the "A" position than in the "B" position. If the input voltage, Vin, is approximately equal to the output voltage, Vout, switches 2,3 will spend an approximately equal time in the "A" and "B" positions.

Figure 1B:
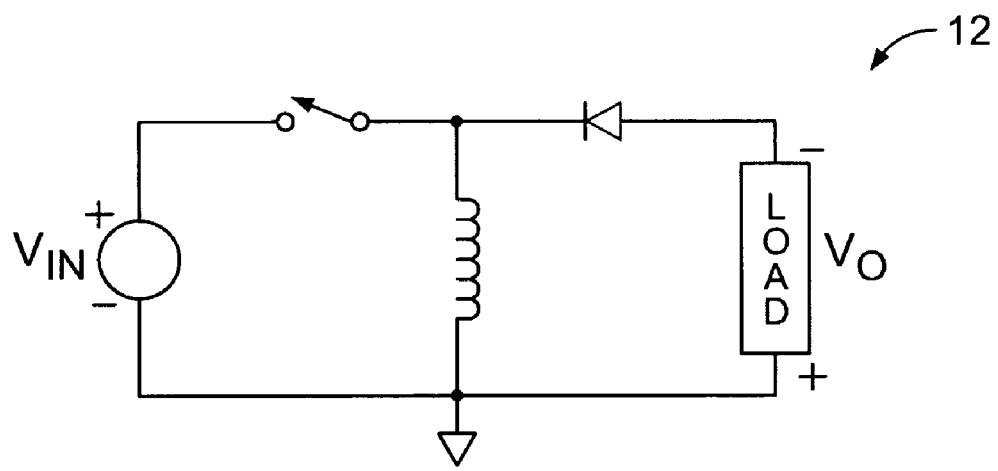

This buck-boost switching architecture is inherently inefficient. Consider, for example, a condition in which the input voltage is just slightly higher or lower than the desired output voltage. Under such a condition, it would be more efficient for the switches to directly connect the input source to the load via the inductor for a large traction, or duty cycle, of the converter cycle. This would minimize overall circuit losses, as it would reduce conduction and switching losses in the switches and the AC core and winding losses in the inductor. Operation of this kind, however, is not provided by the converter of FIG. 1A, because the switches connect the inductor either across the input or across the output but not from the input directly to the output, leading to unnecessary losses in both the switches and the inductor. The converter of FIG. 1B is subject to similar inefficiencies while providing an output with inverted polarity.

Figures 2, 4:
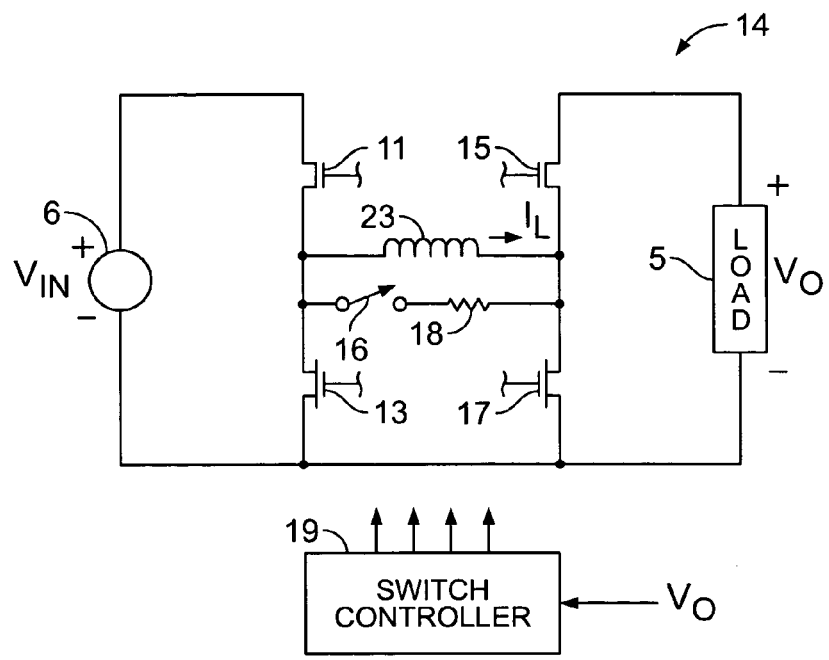
FIG. 2 shows another buck-boost power converter topology.
FIG. 4 shows a switch timing sequence and operating phases for a converter of the kind shown in FIG. 3.

The buck-boost converter architecture of FIG. 2 uses different switch control strategies depending on whether it is in a "buck" control mode; a "boost" control mode; or in a "buck-boost" transition mode, thus requiring a complex control regime. The "buck-boost" mode provides a bridge to achieve continuity in the transition from the boost control architecture to the buck control architecture, but it does so at the expense of increased losses and a reduction in efficiency relative to boost and buck modes that it is bridging. In each of the 3 modes referenced above and with continuous conduction in the inductor, switching losses occur when certain switching elements are turned ON without the voltage across the switching element being reduced prior to turn ON. Even at light load, with discontinuous conduction in inductor 23, a damper circuit, comprising switch 16 and "anti-ring" resistor 18, is included not to recycle but, instead, to dissipate energy stored in the parasitic capacitances of the inductor and the switches.

Figure 3:
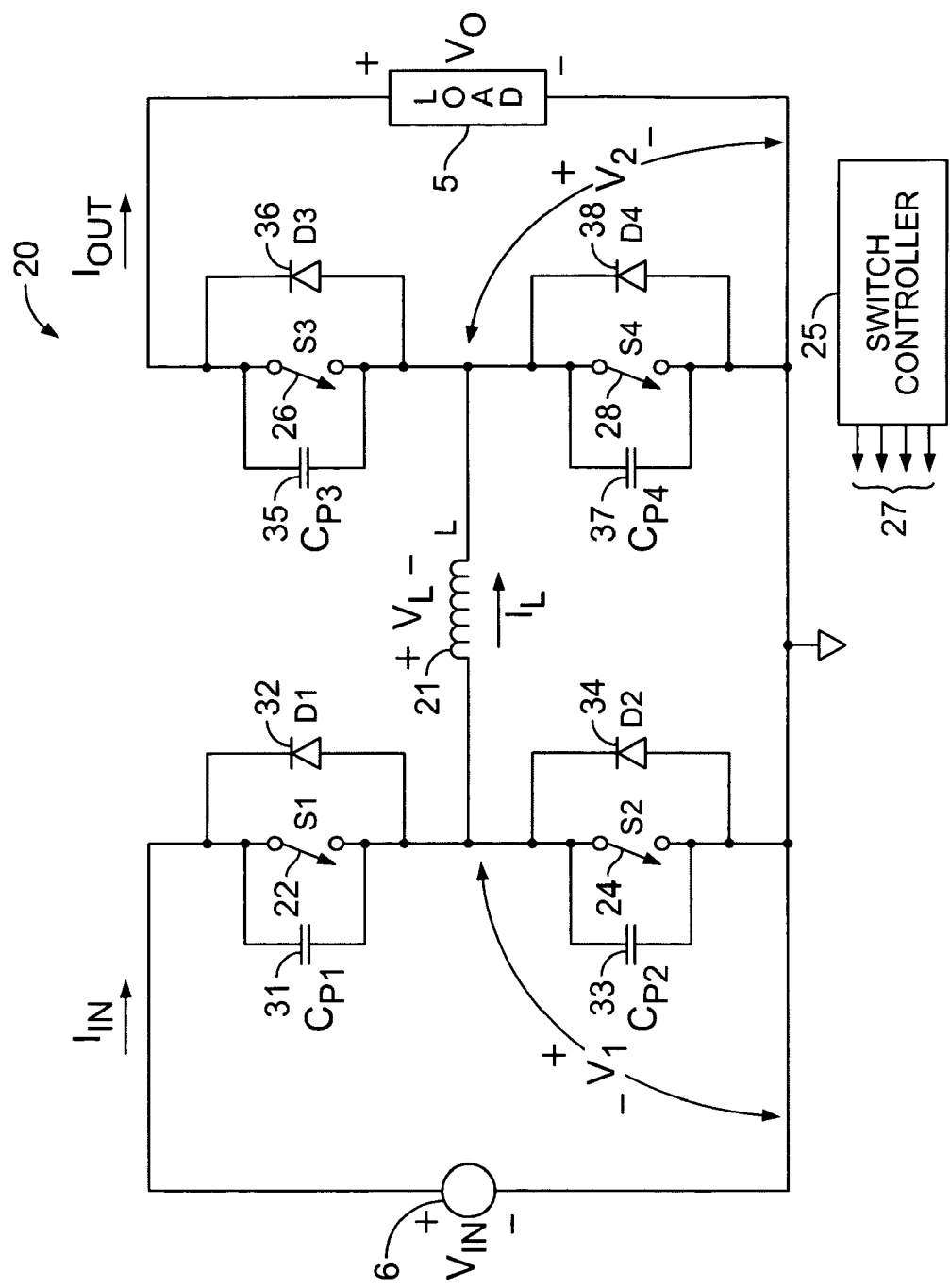
FIG. 3 shows a buck-boost power converter topology for an improved buck-boost converter.

An improved buck-boost converter may be based on the general topology represented in FIG. 3 (including power conversion elements that may not be present in some embodiments) by utilizing a switch controller architecture incorporating improved control algorithms. The power conversion elements include an inductor and switching devices that selectively interpose the inductor between the input source and the load during a power conversion cycle. Within each cycle in a succession of cycles, the inductor current flows bi-directionally from source to load and back to the source to enable the switch controller to turn ON switching devices with reduced switching losses by virtue of zero voltage switching. In spite of discontinuous conduction in the inductor, of the input voltage is relatively close to the desired output voltage, the ratio of peak inductor currant to average inductor current may be made sufficiently close to one to minimize conduction losses and allow conversion efficiency greater than 97% with a power density greater than 500 Watts per cubic inch. Power conversion cycles may share a common sequence of switching phases, irrespective of the input voltage being above, below, or approximately the same as the output voltage, without suffering from boundary discontinuities as the input voltage transitions above or below the output voltage. The phases of each of the cycles, including an input phase, an input-output phase, a free-wheel phase and a clamped phase, may be controlled by the controller based on the input voltage, the output voltage and the load with algorithms that may be adapted, given the availability of spare degrees of freedom, to optimize the performance of the converter for particular applications. The resulting buck-boost technology offers unprecedented performance with respect to power conversion density, efficiency and low noise.

The example of an improved buck-boost converter 20 shown in FIG. 3, with a switch controller 25 incorporating a control architecture such as the one outlined above, provides advantages over the circuits of FIGS. 1 and 2. Converter 20 may comprise: four switches S1 22, S2 24, S3 26 and S4 28; diodes D1 32, D2 34, D3 36 and D4 38; switch controller 25 (described below); and inductor 21 of inductance L. An input source 6, of value Vin. connects to the input of the converter 20; power is delivered by the converter 20 to a load 5 at a voltage Vo. The switch controller 25 delivers control signals 27 to switches S1–S4 to control the ON and OFF states of the switches. Capacitances Cp1 31, Cp2 33, Cp3 35 and Cp4 37, represent the circuit parasitic capacitances, including those of the switches S1–S4, diodes D1–D4 and inductor 21. Switches S1–S4, diodes D1–D4 and some portion of capacitances Cp1–Cp4 may be physically embodied in the same components. For example, MOSFET switches embody a controllable channel, analogous to switches S1–S4; and a "body diode" analogous to diodes D1–D4; and have innate parasitic capacitances, analogous to capacitances Cp1–Cp4.

MOSFET switch S3 acts as a synchronous rectifier by conducting in its channel an average current in the direction of its body diode D3. Switch S3 (and any attendant control function) may be omitted at the expense of potentially higher losses in diode D3. Similarly, other controllable switching and/or rectifying elements may be utilized to selectively enable the conduction of current at the four branches associated with S1, S2, S3 and S4

In some, non-ideal (i.e., real world), embodiments, the switch controller circuitry 25 operates the switches S1–S4 according to the control logic shown in FIG. 4. Each converter operating cycle comprises the sequence of eight phases described in the column headings in the Figure. The sequence repeats in steady state operation. In FIG. 4 a blank table entree means that a switch is OFF. For example, as shown in FIG. 4, switch S1 is ON during the "Input Phase", the "ZVS-S3 Phase" and the "In-Out Phase" and is OFF during the rest of the phases. Operation in a boost mode or buck mode does not require a change in the control logic sequence. Rather, the relative and absolute durations of each of the phases determine whether the converter operates in the boost or buck mode. Thus, as discussed below, a converter can be arranged to generate a constant output voltage, Vout, as its input voltage, Vin, varies over a range of values which extends above and below the value of Vout and it can do so without changing the control logic used for sequencing its switches. Modifications to the logic of FIG. 4 may be made, as discussed below.

Waveforms for the converter of FIG. 3, operating in accordance with the control logic of FIG. 4 in buck mode (i.e., Vout is lower than Vin), are shown in FIGS. 5A through 5I. FIG. 5A through 5D show that the sequence of the ON and OFF states of the four switches S1–S4 conforms to the sequence of states shown in FIG. 4. Prior to time to, switch S4 is ON (FIG. 5D); switches S1, S2 and S3 are OFF (FIGS. 5A, 5B and 5C); the current in the inductor, $I_L$ (FIG. 5E), has a negative magnitude; the voltage across switch S2, V1 (FIG. 5F), has risen to equal the magnitude of the input voltage Vin; and the voltage across switch S4, V2 (FIG. 5G), is close to zero volts, owing to the switch being ON The load 5 is assumed to contain bypass capacitance (not shown) sufficient to filter the pulsating output current, Iout, and produce an essentially constant DC voltage, Vo, across the load. In general, as used herein, the term "ZVS" will refer to a reduction in the voltage across a switch, during a time period when the switch is OFF, resulting from a resonant discharge of capacitances associated with the switch, wherein the reduction may be either complete (i.e., all the way to zero volts) or partial (i.e., to a reduced, but non-zero voltage)

At time $t_0$ the switch controller 25 turns switch S1 ON and the "Input Phase" begins. During the input phase, switches S1 and S4 are ON and the input source 6 is connected across inductor 21. Inductor current, $I_L$ (FIG. 5E), ramps up with a slope equal to Vin/L amperes-per-second, where L is the inductance of inductor 21.

Figure 5A:
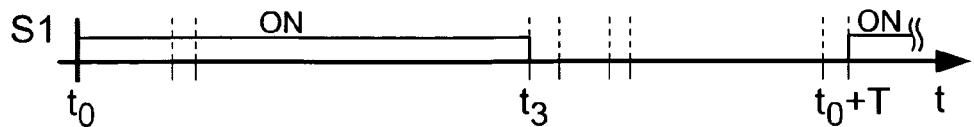
FIGS. 5A through 5I show waveforms for a buck-boost converter operating in puck mode using the timing sequence of FIG. 4.
Figure 5B:
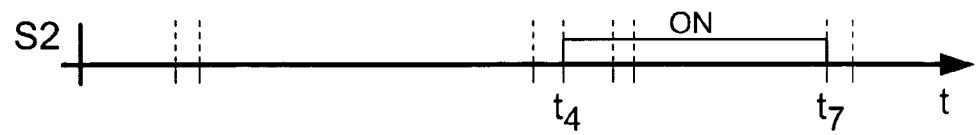
Figure 5C:
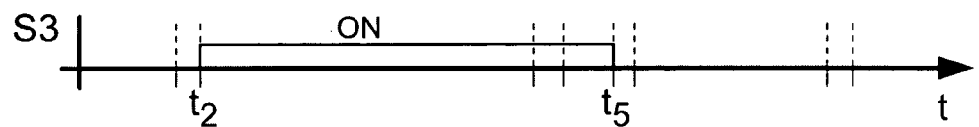
Figure 5D:
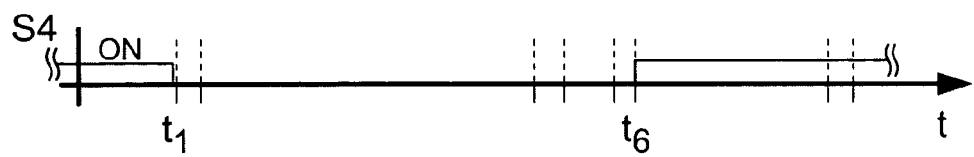
Figure 5E:
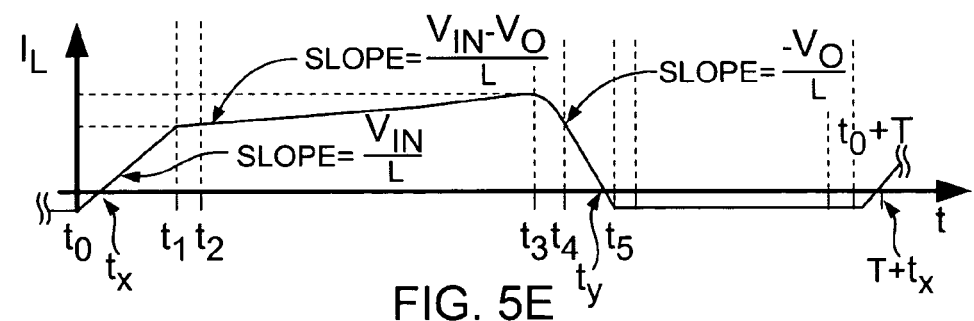
Figure 5F:
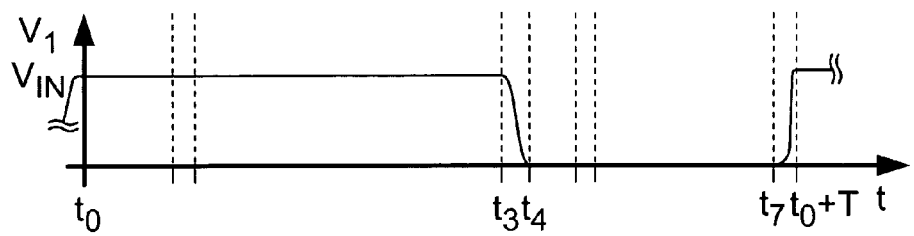
Figure 5G:
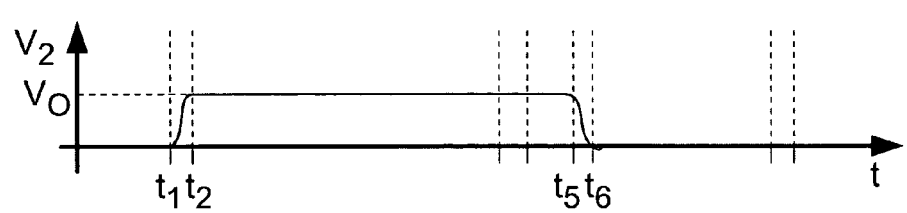
Figure 5H:
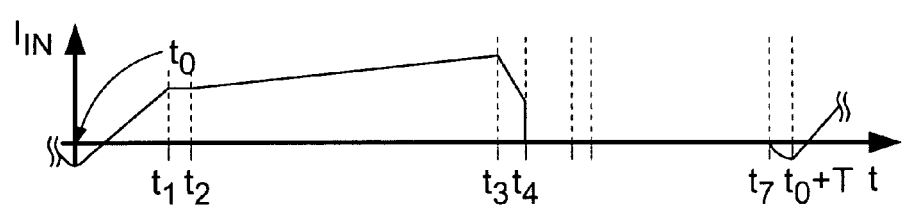
Figure 5I:
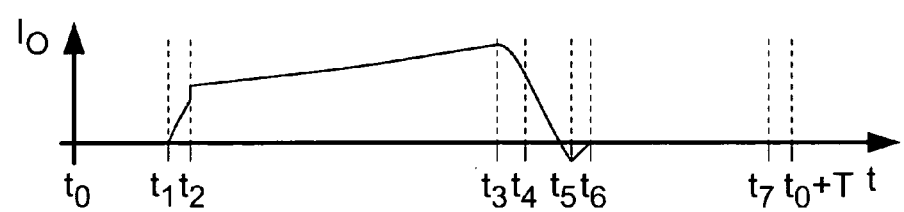
Figure 6A:
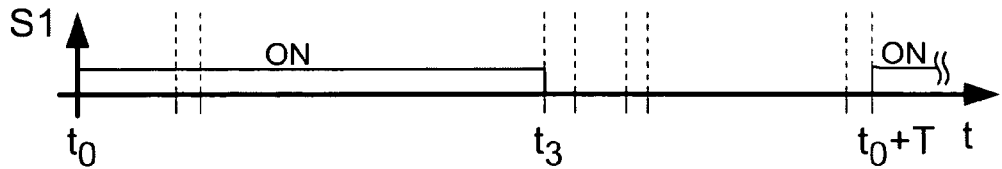
FIGS. 6A through 6I show waveforms for a buck-boost converter operating in boost mode using the timing sequence of FIG. 4.
Figure 6B:
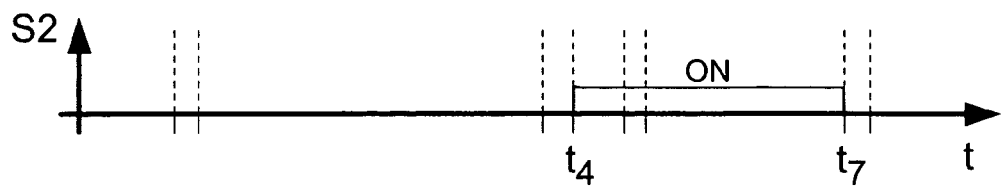
Figure 6C:
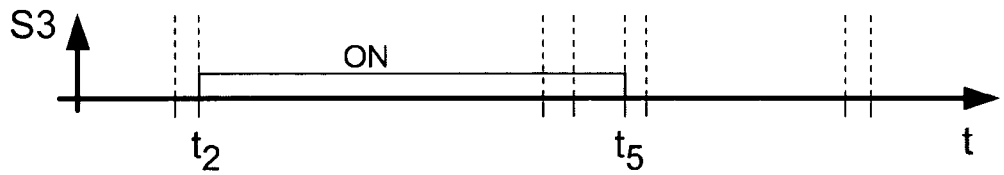
Figure 6D:
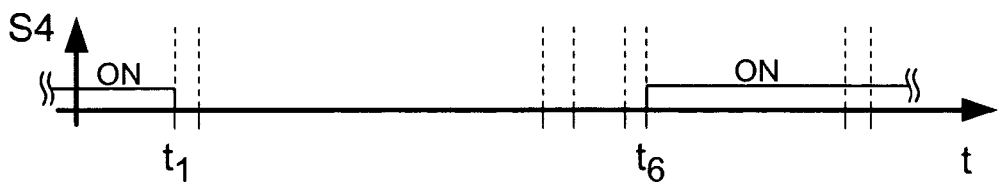
Figure 6E:
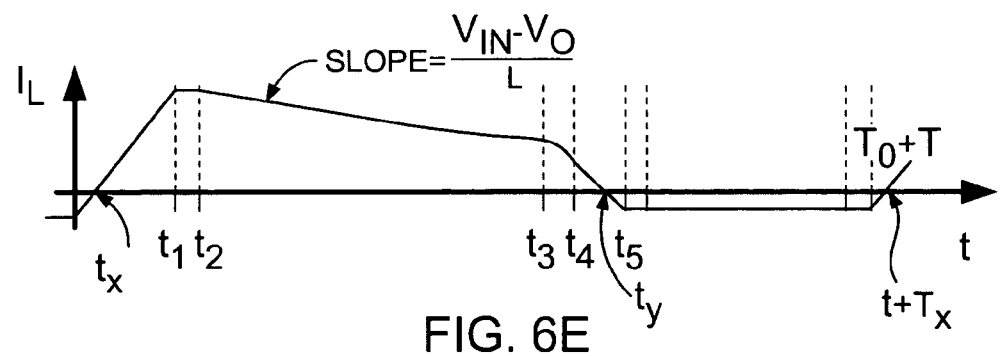
Figure 6F:
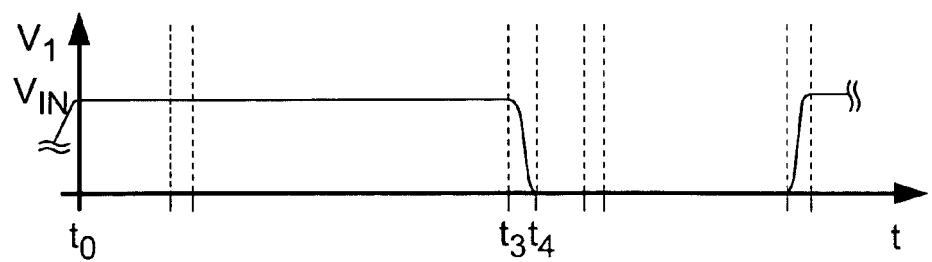
Figure 6G:
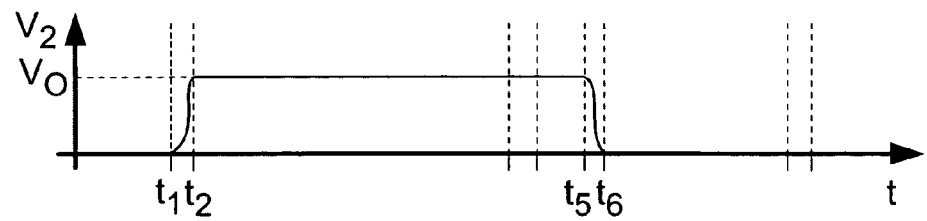
Figure 6H:
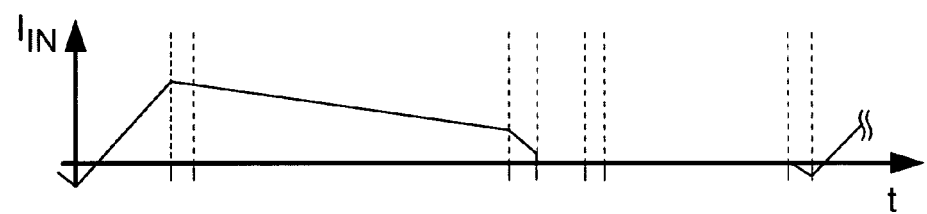
Figure 6I:
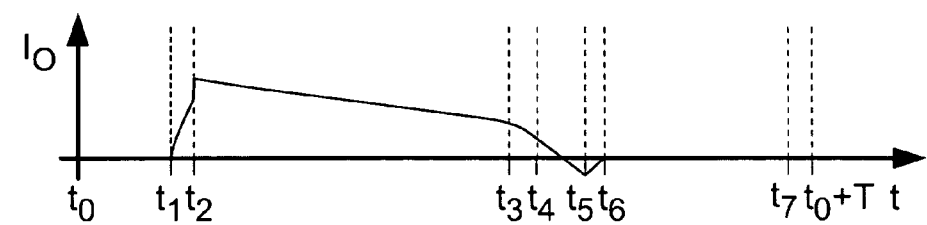

At time t1, switch control circuitry 25 turns switch S4 OFF. Between times t1 and t2 (the "ZVS-S3 Phase", FIG. 4) only switch S1 is ON and the voltage V1 remains equal to Vin (FIG. 5F). With switches S3 and S4 both OFF during the ZVS-S3 Phase, the flow of current $I_L$ will charge and discharge the parasitic capacitances of switches S4 and S3 and the voltage V2 (FIG. 5G) will rise, essentially losslessly, toward the value of the output voltage, Vo. If the ZVS-S3 Phase is sufficiently long, the voltage across switch S3 will be brought to essentially zero volts and S3 can be turned ON essentially without loss. However, a ZVS-S3 Phase of any duration will result in a reduction in the voltage across S3, thereby providing a beneficial reduction in the switching loss associated with the discharge of parasitic capacitances (e.g., capacitances Cp3 35 and Cp4 37) when switch S3 is turned ON. As described above, switch S3, which acts as a synchronous rectifier, may be omitted, allowing current to be carried by rectifier D3, in which case the "ON" entries for S3 in FIG. 4 signify that D3 is forward biased in a state of conduction.

At time t2, the switch control circuitry 25 turns switch S3 ON or, in the absence of S3 rectifier D3 begins conducting. Between times T2 and t3 (the "In-Out Phase", FIG. 4I switches S1 and S3 (D3) are ON, the voltage $V_L$ (FIG. 3) across inductor 21 is positive and equal to Vin–Vo and the current $I_L$ (FIG. 5E) ramps up with a rate of change approximately equal to (Vin–Vo)/L.

At time t3, the switch controller 25 turns switch S1 OFF. Between times t3 and t4 the "Z!S—S8 Phase", FIG. 4) the flow of current $I_L$ will charge and discharge the parasitic capacitances of switches S1 and S2 and the voltage V1 (FIG. 5F) will fall, essentially losslessly toward zero volts. If the ZVS-S2 Phase is sufficiently long, the voltage across switch S2 will be brought to essentially zero volts and S2 can be turned ON essentially without loss. However, a ZVS-S2 Phase of any duration will result in a reduction in the voltage across S2 thereby providing a beneficial reduction in the switching loss associated with the discharge of parasitic capacitances (e.g., capacitances Cp1 31 and Cp2 33) when switch S2 is turned ON.

At time t4, the switch controller 25 turns switch S2 ON. Between times t4 and t5 the "Freewheel Phase", FIG. 4), switches S2 and S3 (D3) are ON and the output voltage is connected as a negative voltage, $V_L=-Vo$, across inductor 21. Inductor current, $I_L$ (FIG. 5E) ramps down with a rate of change approximately equal to –Vo/L. As shown in FIG. 5E the magnitude of the current $I_L$ may be negative at time t5 because of reversal of current through S3 or due to finite reverse recovery of D3.

At time t5, the switch controller 25 turns switch S3 OFF or, in the absence of S3, D3 stops conducting. Between times t5 and t6 (the "ZVS-S4 Phase", FIG. 4) only switch S2 is ON and the voltage V1 remains equal to zero (FIG. 5F). With switches S3 (D3) and S4 both OFF during the ZVS-S4 Phase, the negative flow of current $I_L$ will charge and discharge the parasitic capacitances of switches S3 (D3) and S4 and the voltage V2 (FIG. 5G) will fall, essentially losslessly, toward zero. If the ZVS-S4 Phase is sufficiently long, the voltage across switch S4 will be brought to essentially zero volts and S4 can be turned ON essentially without loss. However, a ZVS-S4 Phase of any duration will result in a reduction in the voltage across S4, thereby providing a beneficial reduction in the switching loss associated with the discharge of parasitic capacitances (e.g., capacitances Cp3 35 and Cp4 37) when switch S4 is turned ON.

Any reversal of current through synchronous rectifier S3 or diode D3, owing to the finite recovery time of silicon junction rectifiers, gives rise to energy stored in inductor 21. And even if S3 is turned off at essentially zero current or if, in the absence of S3 diode D3 is implemented using a fast recovery time device, such as a Schottky rectifier energy associated with the parasitic capacitances of such switching elements gives rise to energy stored in inductor 21 which can be recycled and used to reduce switching losses in a subsequent switching transition.

At time t6, the switch controller 25 turns switch S4 ON. Between times t6 and t7 the "Clamped Phase", FIG. 4), switches S2 and S4 are ON, the voltage $V_L$ (FIG. 3) across inductor 21 is essentially zero and the current $I_L$ (FIG. 5E) remains essentially constant assuming low DC losses in inductor 21 and switches S2 and S4) and negative. As described in the '750 application, clamping the inductor non-dissipatively, to trap and recycle energy associated with parasitic capacitances and/or the reverse recovery of a synchronous) rectifier, prevents undesirable oscillations and does so with much lower loss in comparison to losses in conventional resistive dampers or "anti-ring" resistors. The energy retained within the inductor by circulating current while the inductor is clamped to essentially zero voltage may be used to reduce the switching loss in the following transition. While the time interval between t6 and t7, as depicted in FIG. 5, represents a significant fraction of the power conversion cycle, the "Clamped Phase" time interval may be minimized to a very small fraction of the cycle or omitted entirely.

At time t7, the switch controller 25 turns switch S2 OFF. Between times t7 and to +T (the "ZVS-S1 Phase", FIG. 4) only switch S4 is ON and the voltage V2 remains essentially equal to zero (FIG. 5F). With switches S1 and S2 both OFF during the ZVS-S1 Phase the negative flow of current $I_L$ will charge and discharge the parasitic capacitances of switches S2 and S1 and the voltage V1 (FIG. 5F) will rise, essentially losslessly, toward Vin. If the ZVS-S1 Phase is sufficiently long and enough energy was stored in inductor 21 from the prior cycle, the voltage across switch S1 will be brought to essentially zero volts and S1 can be turned ON essentially without loss. However, a ZVS-S1 Phase of any duration will result in a reduction in the voltage across S1, thereby providing a beneficial reduction in the switching loss associated with the discharge of parasitic capacitances (e.g., capacitances Cp1 31 and Cp2 33) when switch S1 is turned ON At time to +T, the switch controller 25 turns switch S1 ON, beginning another converter operating cycle.

Waveforms for the converter of FIG. 3, operating in accordance with the control logic of FIG. 4 in a boost mode (i.e., Vin is lower than Vout), are shown in FIGS. 6A through 6I. As shown in FIGS. 6A through 6D, the sequence of the ON and OFF states of the four switches S1–S4 conforms to the sequence of states shown in FIG. 4. The discussion above, regarding the buck mode waveforms of FIG. 5, applies to the waveforms of FIG. 6. The key difference between the two modes is that in the buck mode the current $I_L$ increases, with a positive rate of change equal to +(Vin–Vo)/L, during the In-Out Phase, whereas in the boost mode the current $I_L$ decreases, with a negative rate of change equal to −(Vo−Vin)/L, during the In-Out Phase. As in the buck mode of operation synchronous rectifier switch S3 may be replaced by a two terminal rectifier.

A feature of the improved buck-boost converter is the reversal of current in the inductor over a range of operating load levels, including the rated maximum operating power level ("full load" operation) of the apparatus, and the exploitation of that reversal of current to provide ZVS of switches S1 and S4 during the ZVS-S1 and the ZVS-S4 Phases. Certain prior art buck-boost converters, such as the converter described with reference to FIG. 2, operate with continuous current in the inductor over a range of loads, including full load. Such converters can incorporate a ZVS-S2 and ZVS-S4 Phase at elevated load but cannot incorporate the ZVS-S1 Phase and the ZVS-S4 Phase at those loads. Because heat loss causes increased operating temperatures and reduced component reliability, loss reduction is most important when the converter is operating at elevated loads, including full load. Thus, the presence of the ZVS-S1 and ZVS-S4 phases at elevated loads including full load, is of importance.

Certain modifications may also be made to the timing of the switches. We assume the use of MOSFET switches. We first note that switch S4 is shown in FIGS. 5 and 6 being turned ON at time t6, which is essentially the instant at which the voltage across S4 is discharged to zero. Turning ON at this time yields the highest operating efficiency as it eliminates switching loss in S4 and bypasses diode D4 during the clamped phase, thereby reducing conduction loss (it will be assumed that switches S1–S4 are selected so that the voltage drop across any switch, when the switch is ON, is less than the voltage drop across its associated diode, D1–D4). However, switch S4 can be turned ON at any time which is after time t5 (provided that some finite delay time is provided after t5 during which switches S3 and S4 are both OFF) and which is before time, T+tx, when the current $I_L$ becomes positive. Although turning switch S4 ON at times other than time t6 will either increase switching loss or increase conduction loss in diode D4, the converter may still achieve high performance. Similarly, switch S1 can be turned ON at any time after time t7 (provided that some finite delay time is provided after t7 during which switches S1 and S2 are both OFF) and, preferably, before time T+tx, when the current $I_L$ becomes positive. Similarly, switch S2 may be turned ON at any time after time t3 (provided that some finite delay time is provided after t3 during which switches S1 and S2 are both OFF) and, preferably, before time ty; and switch S3, if present, may be turned ON at any time after time t1 (provided that some delay time is provided after t1 during which switches S3 and S4 are both OFF) and, preferably, before time ty.

In, an example of a typical application, the converter architecture described above may be required to deliver a fixed output voltage, Vo=Vout, as the input voltage, Vin, vanes over a range of values that extends both below and above Vo. To the extent that the general timing architecture incorporates a number of degrees of freedom (including the durations of the Input Phase, the In-Out Phase and the Clamped Phase) in excess of the minimum required to control the output voltage, there is spare degrees of freedom and a continuum of alternative control strategies which retain the architectural sequence of the switch states (e.g., using the sequence of FIG. 4). One example is explained conceptually with reference to FIGS. 7A through 7C, FIGS. 8A through 8C, and FIGS. 9A through 9C. Each set of Figures shows waveforms for the inductor current, $I_L$, the converter input current, Iin, and the converter output current, Iout, of an idealized converter of FIG. 3. By "idealized" we mean that all circuit components, including switches S1–S4, are ideal, and that there are no parasitic capacitances, inductances or resistances in the circuit. For such a circuit the four-"ZVS Phases" described above may be ignored. In each set of Figures, the time period T1 corresponds to the Input Phase of FIG. 4: the time period T2 corresponds to the In-Out Phase of FIG. 4; the time period T3 corresponds to the Freewheel Phase of FIG. 4; and the time period T4 corresponds to the Clamped Phase of FIG. 4. As mentioned above, the load 5 on the converter is assumed to contain filtering capacitance (not shown) sufficient to smooth Vo into an essentially DC value.

Figure 7A:
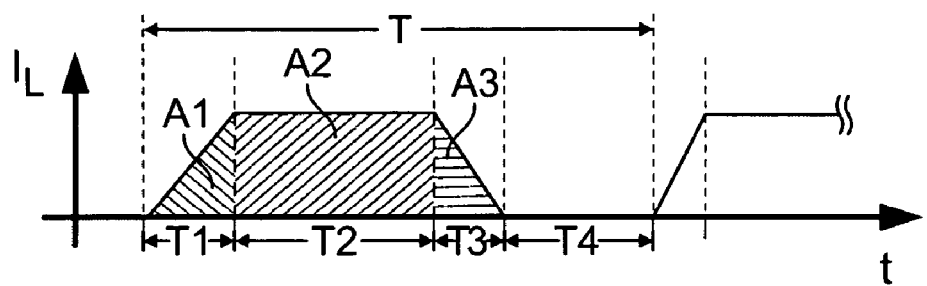
FIGS. 7A through 7C show waveforms for an idealized converter operating with in input voltage approximately equal to the converter output voltage.
Figure 7B:
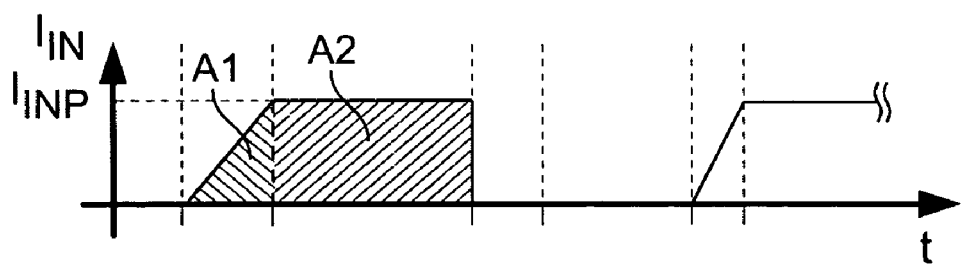
Figure 7C:
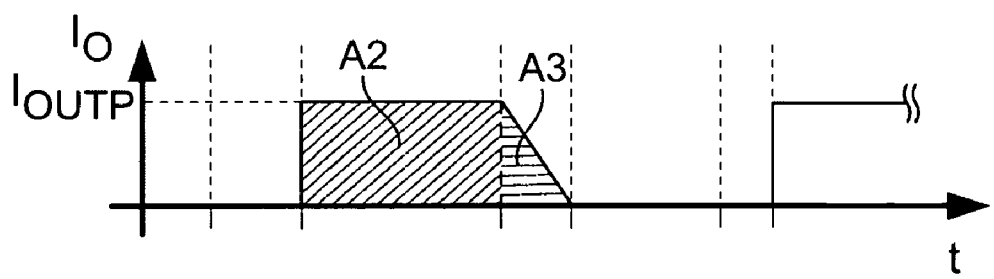

FIGS. 7A, 7B and 7C show steady-state waveforms for the case where Vin~Vo is approximately equal to Vout, at a fixed value of load. With Vin approximately equal to Vo the average input current and the average output current are approximately equal. This requires that the area, A1+A2, under the Iin waveform be approximately equal to the area A1+A3 under the Iout waveform and that T1 be approximately equal to T3. With these conditions, the average values of Iin and Iout are also equal. Note also, the slope of the currents during the In-Out Phase is zero and that the peak values of the currents Iin and Iout are, respectively, Iinp and Ioutp.

Figure 8A:
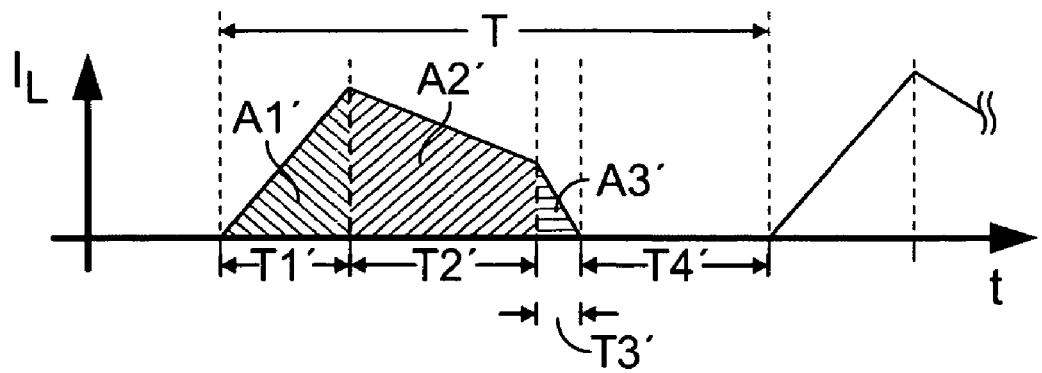
FIGS. 8A through 8C show waveforms for an idealized converter operating with an input voltage that is less than the converter output voltage.
Figure 8B:
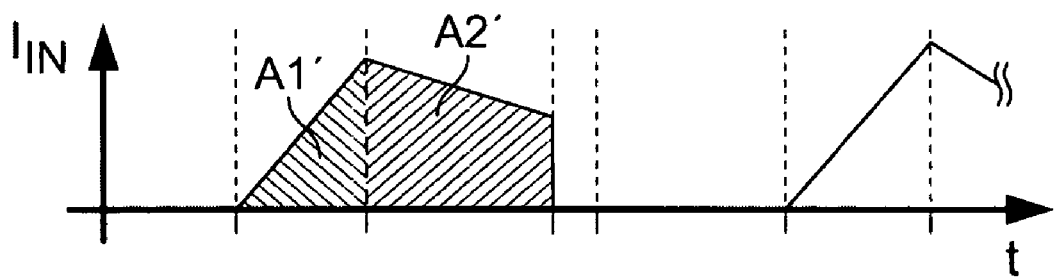
Figure 8C:
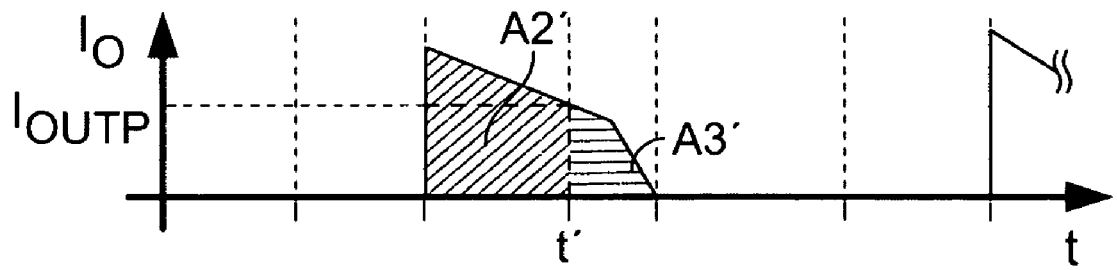

We now assume that the input voltage is reduced so that Vin<Vout. If the relative and absolute switch timing were the same as those used in FIG. 7, the steady-state value of Vo would drop to equal the new, reduced, value of Vin and power delivered to he load would drop accordingly. In order to maintain Vo equal to the desired Vout with Vin<Vout the relative switch timing shown in FIGS. 5A through 8C may be employed. In FIG. 8, the time period of the Input Phase, T1', is increased relative to the corresponding time period, T1, in FIG. 7. The duration of the In-Out Phase (of duration T2'=T2) is not changed, nor is the total period T. Under this condition, the average value of the output current in FIG. 8C will be the same as that in the example of FIG. 7C if the sum of the areas A2'+A3' in FIG. 8C is equal to the sum of the areas in A2–A3 in FIG. 7C. This requirement can only be met if the time, t' (FIG. 8C), at which the current delivered to the output, Io, (FIG. 8C) is equal to Ioutp (the peak value of Io in the example of FIG. 7C), occurs during the second half of the In-Out Phase. Under this circumstance, the area A3' will be less than the area A3, but the area A2' will be greater than the area A2. As T1 increases, the time t' will move out in time and, for some value of T1'>T1 the average output voltage and current will be the same as that of FIG. 7.

Figure 9A:
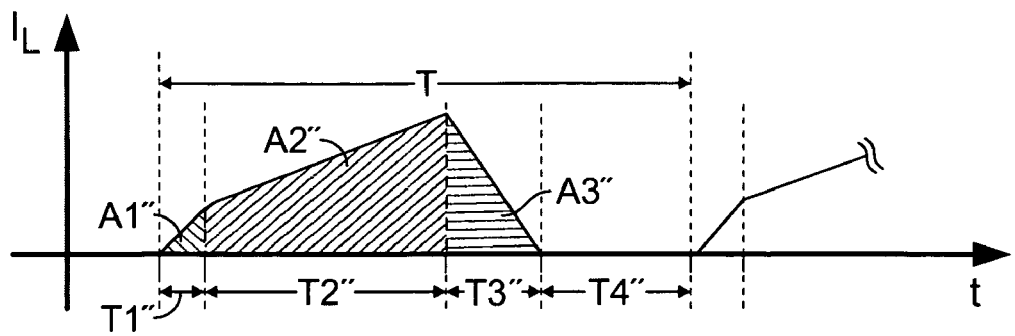
FIGS. 9A through 9C show waveforms for an idealized converter operating with an input voltage that is greater than the converter output voltage.
Figure 9B:
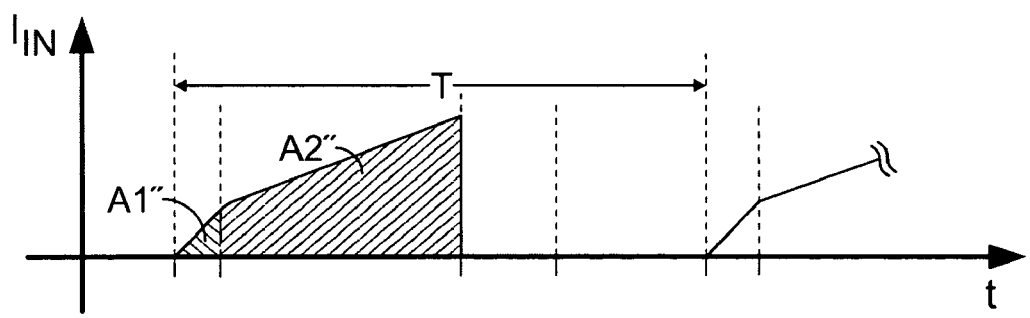
Figure 9C:
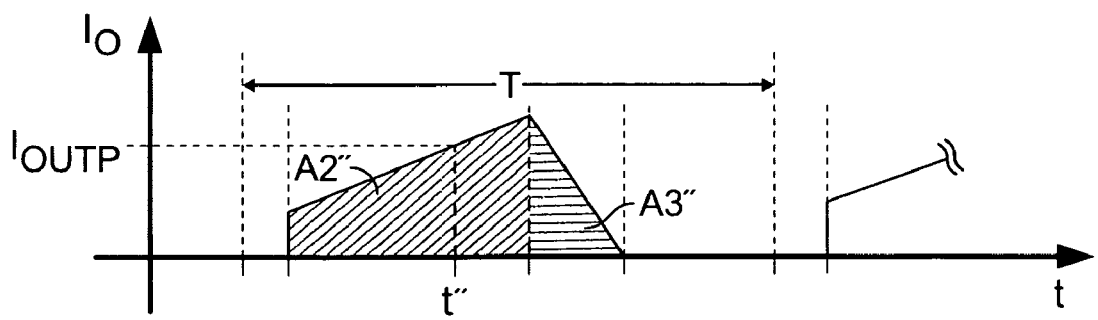

Using an argument analogous to that used to explain FIG. 8, if Vin increases above the desired value of Vo, the output voltage may be held at a constant value Vout by reducing the duration of the Input Phase. This is shown in FIGS. 9A through 9C: in order for the area A2"+A3" in FIG. 9C to be equal to the area A1+A3 in FIG. 7C, the duration, T1" of the In-Out Phase may be reduced so that the value of Io (FIG. 9C) is equal to Ioutp at a time, t" within the second half of the In-Out Phase, such that the reduction in the area A2" relative to A2 is compensated by the increase in the area A3" relative to A3.

Figure 10:
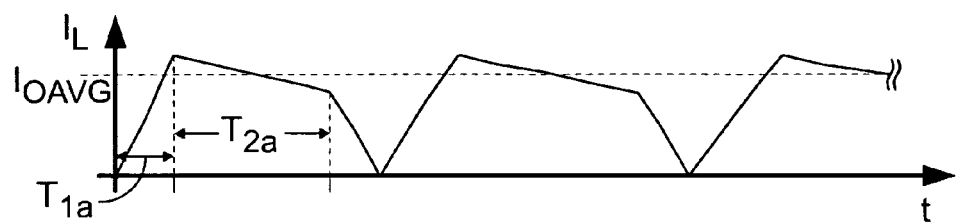
FIGS. 10 through 14 show additional waveforms for an idealized converter.
Figure 11:
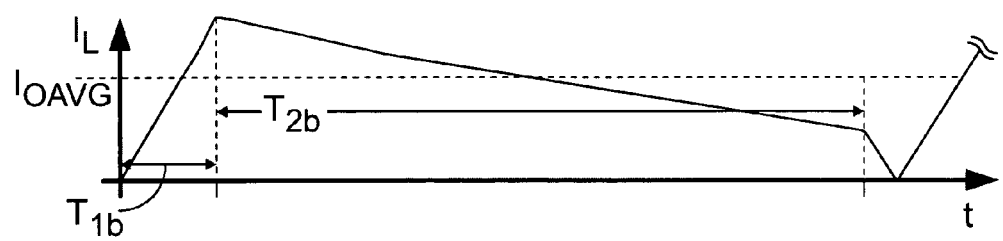
Figure 12:
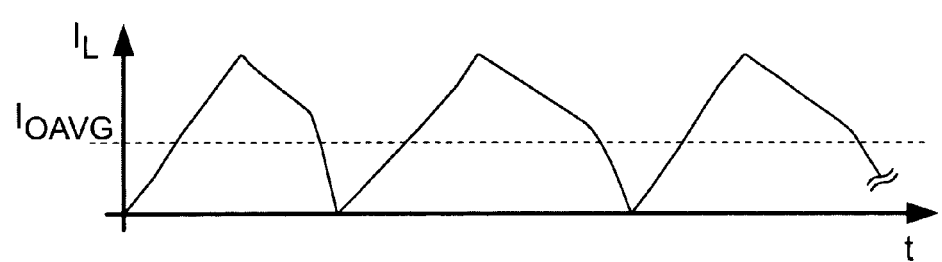
Figure 13:
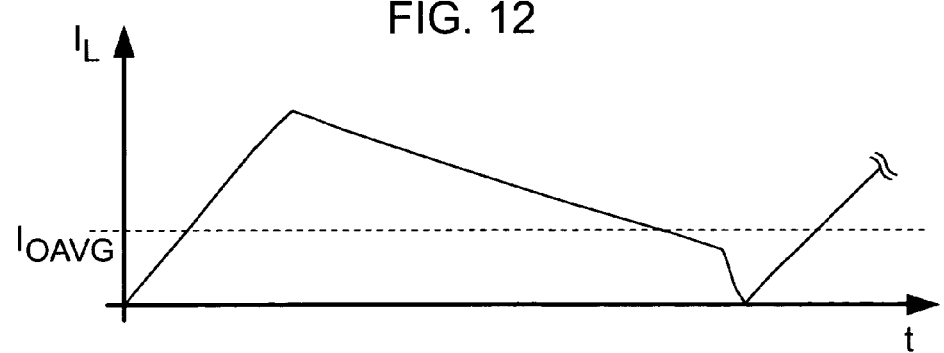
Figure 14:
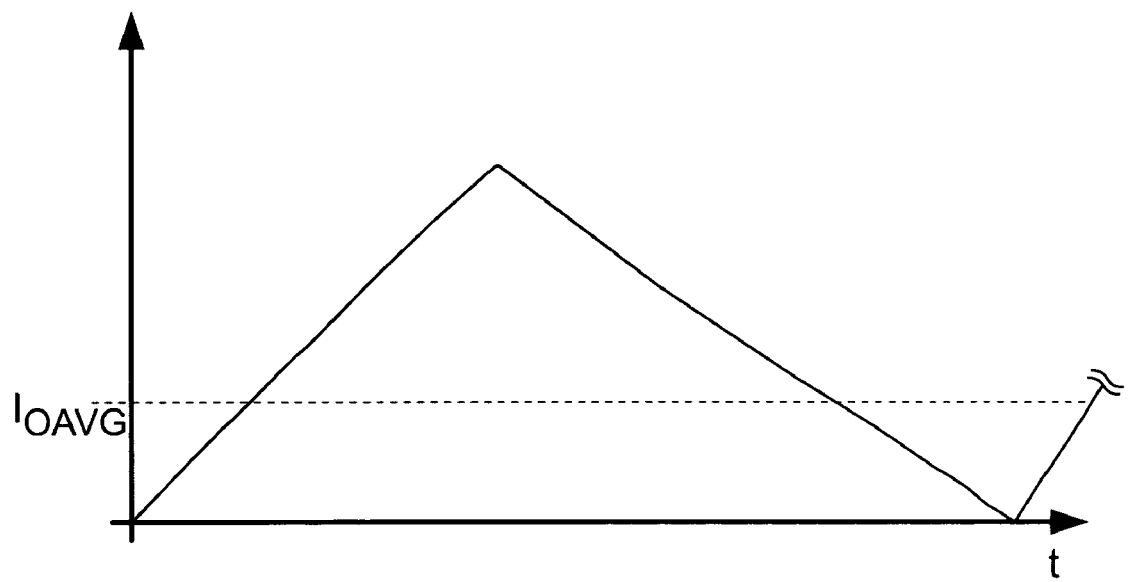

The control variables available for controlling the output voltage in such a converter, as the input voltage and load vary, include the duration of the Input Phase, T1; the duration of the In-Out Phase, T2; and the duration of the Clamped Phase, T4. The duration of the Freewheel Phase, T3, is not an independent variable; its duration is dependent on the values of T1 and T2. In non-ideal converters, it will generally be beneficial, except for light load operation, to maintain the Clamped Phase, T4, which represents a dead time during which the converter is not processing power, as short as possible. Furthermore, as Vin gets close in value to Vout, it will be beneficial to decrease tile converter operating frequency (i.e., increase the operating period, T), as doing so will reduce losses in a non-ideal converter. In particular, in the limiting case where the difference between Vin and Vout approaches the voltage drop in the DC resistance of the inductor 21 and switching elements 22 and 26, switching could be reduced to a low frequency and power would flow from input to output, through the inductor 21, with low switching losses or AC winding or core losses, and with low input and output ripple currents. Using these principles, the control strategy illustrated in FIGS. 7, 8 and 9 may be refined A relined control strategy is illustrated with reference to FIGS. 10 through 14 which show inductor current, $I_L$, in an "idealized" converter of FIG. 3 (where the term "idealized" converter has the same meaning as was described and applied above to the examples of FIGS. 7, 8 and 9 and wherein the ZVS intervals in the converter are ignored). In each Figure: the converter delivers the same output voltage, Vo=Vout, at the same value of average load current, Ioavg; the durations of the Input Phase, T1, and the In-Out Phase, T2, are set to (different) values which maintain the output voltage equal to VOUT: and the dead time associated with the Clamped Phase is minimized by starting a new operating cycle immediately following completion of the Freewheel Phase. FIGS. 10 and 11 art for a fixed value of Vin=V1, where V1 is less than and relatively close in value to Vout. FIGS. 12, 13 and 14 are for a fixed value of Vin=V2, where V2 is less than and significantly different in value to Vout.

Because the input and output voltages are close in value, the slope of the inductor current during the In-Out Phase in the waveforms of FIGS. 10 and 11 is small. To achieve the same average output current, the duration of both the Input Phase (T1a, FIG. 10; T1b. FIG. 11) and the In-Out Phase (T2a, FIG. 10; T2b, FIG. 11) are made longer in FIG. 11 than they are in FIG. 10. This leads to a greater peak-to-peak variation in $I_L$ during the In-Out Phase in the waveform of FIG. 11, but it also results in a lower operating frequency. As explained above, the lower operating frequency may be beneficial in that it may provide for reduced switching loss and core loss in the inductor.

Where the input and output voltage are significantly different, as is the case in FIGS. 12, 13 and 14, the inductor current during the In-Out Phase will exhibit a significant slope. As illustrated in the Figures, for the same average value of output current and power an increase in the duration of the In-Out Phase will result in a sharp increase in the peak value of the current and in the rms value of the current. This, in turn, will increase both AC core losses and rms losses in non-ideal components.

The waveforms of FIGS. 10 through 14 indicate that when Vin is approximately equal to Vout it is desirable to increase the duration of the In-Out Phase. Conversely, as the values of Vin and Vout diverge, the duration of the In-Out Phase may be decreased. This leads to a good control strategy comprising three elements: (1) the-duration of the Clamped Phase is minimized by starting a new operating cycle shortly after completion of the Freewheel Phase, except at light loads, where a substantially long Freewheel Phase may be desirable to limit maximum operating frequency; (2) the duration of the In-Out Phase. 1.2, is varied in an inverse relationship to the difference between Vin and Vout, i.e. T2 is decreased as the absolute value of (Vin−Vout) increases and T2 is increased as the absolute value of (Vin−Vout) approaches zero, except that a maximum duration of the In-Out Phase may be enforced to limit minimum operating frequency; (3) the length of the Input Phase, T1, is varied as the primary control variable in proportion to the load current and in inverse proportion to the input voltage.

For a given value of input and output voltage, the control strategy summarized in the preceding paragraph will generally result in an increase in converter operating frequency as load is decreased. To limit the maximum converter operating frequency, the control strategy may be further refined by addition of a fourth element:(4) a lower limit is set on the converter operating period or a maximum limit is set on the operating frequency. In practice this may be accomplished by preventing initiation of a new converter operating cycle until a predefined minimum time period, Tmin, has elapsed after the initiation of the prior converter operating period. The effect of this "frequency stop" will be an increase in the "dead time" (in the form of an increasingly long Clamped Phase) within the converter operating cycle as load is reduced to values below which the operating period would otherwise decrease below Tmin.

Finally the control strategy may be refined by addition of a fifth element: (5) a lower limit is set on the converter operating frequency, or an upper limit is set on the operating period. The effect of this "period stop" is to avoid generating arbitrarily long periods and low frequency harmonic components in the "degenerate" case of the input voltage approaching the desired output voltage.

Figure 15:
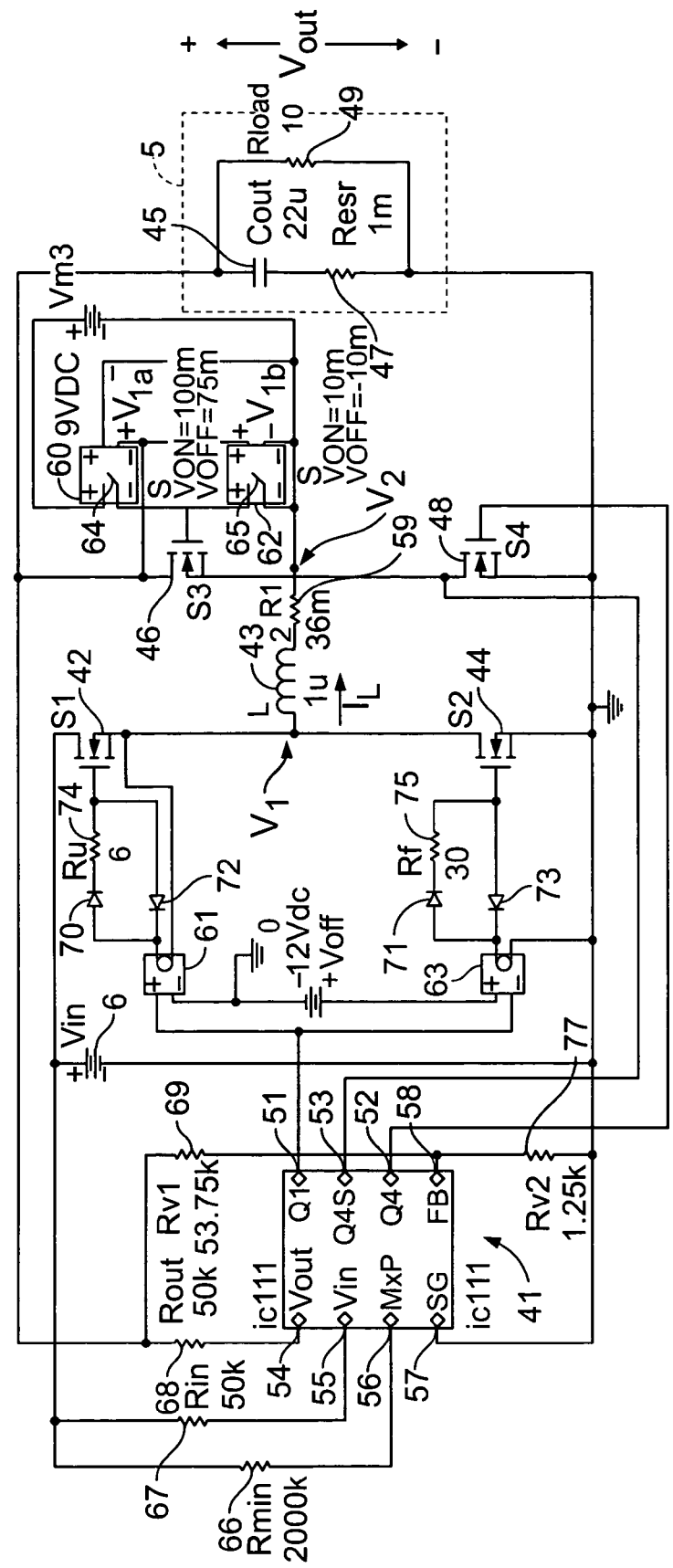
FIG. 15 shows a schematic diagram of an improved buck-boost converter comprising switch control circuitry.
Figure 16:
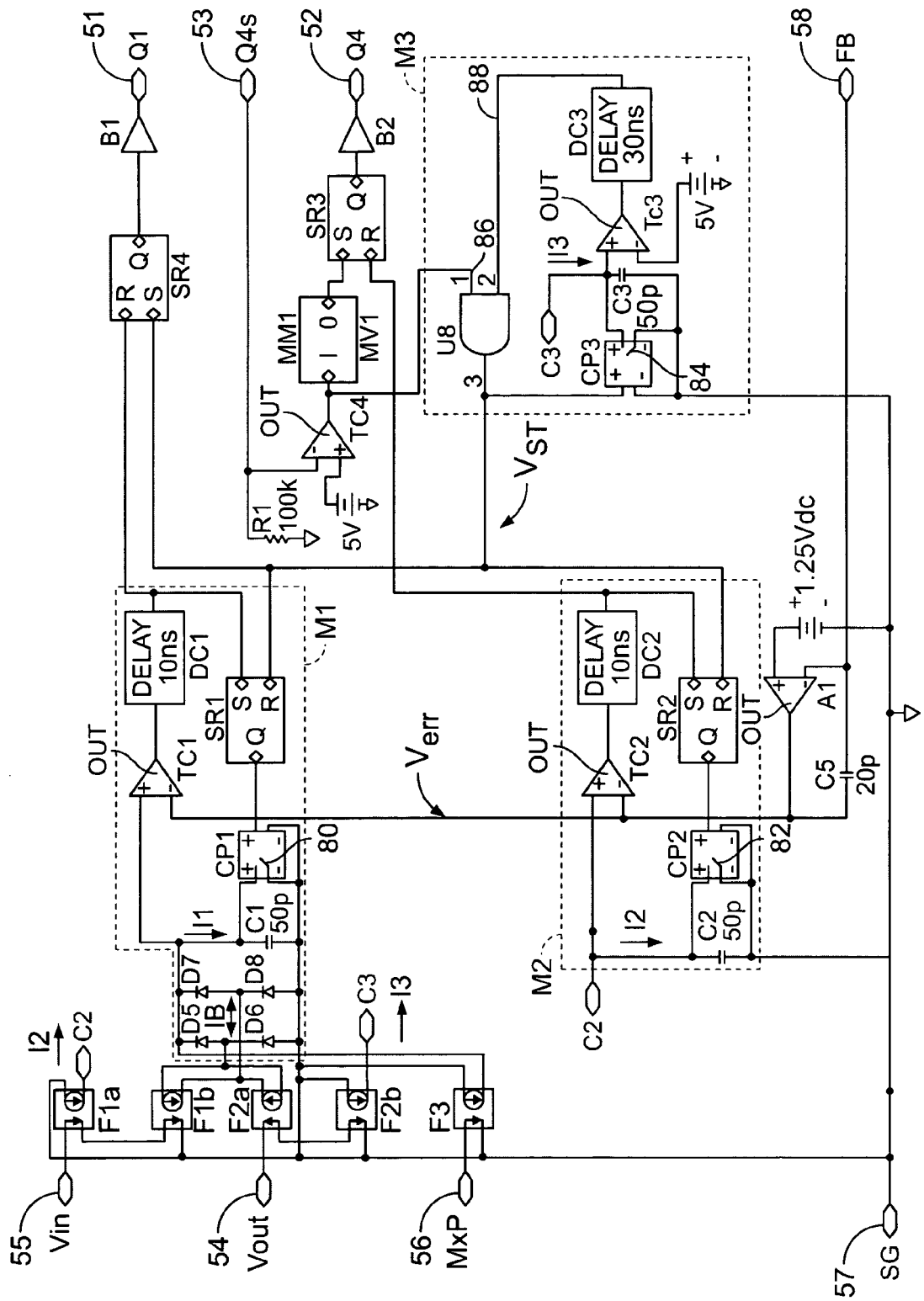
FIG. 16 shows a schematic of the switch control circuitry in the converter of FIG.

FIGS. 15 and 16 are schematic diagrams of an improved buck-boost converter 40 comprising, a switch controller that, as described below, operates the switches in in accordance with the "five element" control strategy outlined above. In FIG. 16, the buck-boost converter 40 comprises: MOSFET switches S1 42, S2 44, S3 46 and S4 48 the MOSFET switches also comprise intrinsic body diodes, not shown in FIG. 16, that are analogous to, and which have the same function and polarity as diodes D1 32, D2 34, D3 36 and D4 38 in FIG. 4, above); switch control circuitry 41 (described below); inductor 43 (having and inductance L and an average equivalent series resistance, R1 59). An input source 6 of value Vin, connects to the input of the converter 40; power is Delivered by the converter 40 to a load 5, the load comprising a filter capacitor, represented by ideal capacitor 45 and an equivalent series resistance, Resr 47, and a load resistor 49. Rload. Active rectifier circuits 60, 62 (which may be of the kind described in U.S. patent application Ser. No. 09/499,822, "Integrated Active Rectifier", assigned to the same assignee as this application and incorporated by reference in its entirety) comprise, respectively, switches 64, 65 which are controlled, respectively, by input voltages V1a and V1b. Gate drive circuitry for switch S1 42, comprises buffer 61, diodes 70, 72 and resistor Ru 74; gate drive circuitry for switch S2 44, comprises buffer 63, diodes 71, 73 and resistor Rf 75. Resistors Rmin 66, Rin 67, Rout 68 and Rv1 69 are connected to terminals of switch controller 41, as described below. As described earlier, the controller circuitry also comprises circuit parasitic capacitances, including those of the switches S1 54, diodes D1–D4 and inductor 21, and analogous to capacitances Cp1 31, Cp2 33, Cp3 35 and Cp4 37, described above with respect to the circuit of FIG. 4. FIG. 16 shows a schematic diagram of the switch controller 41. Operation of the circuit of FIG. 15 is explained with reference to FIGS. 4, 15 and 16.

Referring to FIG. 16, the switch controller 41 incorporates three timers M1, M2, M3 whose timing values are dependent upon one or more currents. Timer M1 receives a current I1 from the diode bridge comprising diodes D5, D6, D7 and D8. The current I1 is an unipolar current whose value is equal to the sum of two currents, one being the current delivered by the diode bridge, which is equal to the absolute value of the bipolar current, Ib. flowing into the inputs of the diode bridge, and the other being the unipolar current delivered by the current-to-current converter F3. The current Ib is equal to the difference between the currents delivered by the current-to-current converters F1b and F2a. Each of the current-to-current converters delivers an output current which is proportional to the current flowing in its input terminals. Referring to FIGS. 15 and 16, the current delivered by current-to-current converter F1b is proportional to the current delivered to the Vin input terminal 55 of the switch controller, which is, in turn, proportional to the converter input voltage, Vin, and inversely proportional to the value of resistor Rin 67; the current delivered by current-to-current converter F2a is proportional to the current delivered to the Vout input terminal 54 of the switch controller, which is, in turn, proportional to the converter output voltage, Vout, and inversely proportional to the value of resistor Rout 68; and the current delivered by current-to-current converter F3 is proportional to the current delivered to the M×P input terminal 56 of the switch controller, which is, in turn, proportional to the converter input voltage, Vin, and inversely proportional to the value of resistor Rmin 66. In a similar fashion, the current I2, delivered by current-to-current converter F1a, is proportional to the converter input voltage. Vin, and the current I3, delivered by current-to-current converter F2b, is proportional to the converter output voltage, Vout. Thus, with the polarities shown, the currents I1, I2 and I3 may be described as follows:

$$I1 = K1 * abs(Vin - Vout) + K2 * Vin \quad (1)$$

$$I2 = K3 * Vin \quad (2)$$

$$I3 = K4 * Vout \quad (3)$$

where "abs" means "the absolute value of" and K1, K2, K3 and K4 are constants which are dependent upon the constant gains of the current-to-current converters F1a, F1b, F2a, F2b and F3 and the values of resistors Rin, Rout, and Rmin.

As shown in FIG. 16, each timer M1, M2, M3 comprises a logically controlled switch (CP1. CP2 and CP3, respectively). Each logically controlled switch comprises an output switch 80, 82, 84 that is connected across a timing capacitor (C1, C2 and C3, respectively). An output switch in a logically controlled switch is closed, and its respective capacitor is discharged, when the input terminals of the logically controlled switch are driven logically high; an output switch in a logically controlled switch is open when the input terminals of the logically controlled switch are driven logically low. For example the output switch 80 of logically controlled switch CP1, connected across capacitor C1 is closed, and C1 is discharged, whenever the Q output of Set-Reset flip-flop SR1 is set logically high and the output switch is open whenever the Q output of SR1 is set logically low. The output switches 82, 84 of logically controlled switch CP2 and CP3 are similarly controlled by the logic states at the outputs of Set-Reset flip-flop SR2 and AND gate U8, respectively. Each timer M1, M2, M3 also comprises a delay Circuit. DC1, DC2 and DC3, respectively. The delay circuits are incorporated to account for propagation delays in the timer comparators (TC1, TC2 and TC3) as well as to ensure that under all conditions, the timing capacitors can be suitably discharged.

Figure 17:
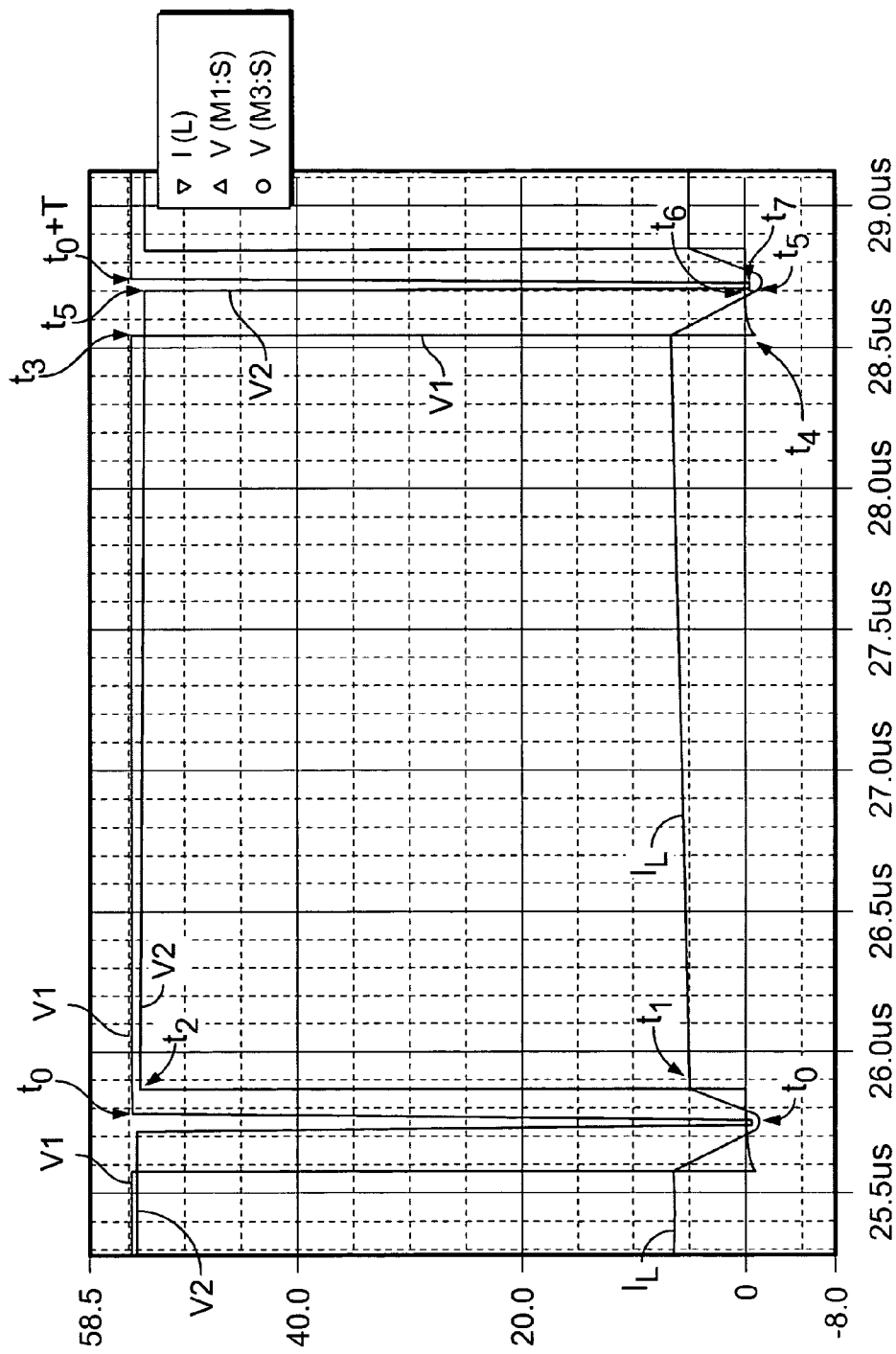
FIGS. 17 through 22 show waveforms for the converter of FIG. 15.

FIG. 17 shows simulated waveforms for the converter of FIG. 15 operating under steady-state conditions with an input voltage of 55 VDC; an output voltage of 54.5 VDC: and wraith a load resistor 49 of value Rload=10 ohms (i.e., the converter delivers and output power of 297 Watts). MOSFET switches S1 42, S2 44, S3 46 and S4 48 are, respectively, 30 mOhm/100 V, 60 mOhm/100 V, 10 mOhm/60 V and 20 mOhm/60 V devices. Inductor 43 is of value L=1 microhenry and has an equivalent series resistance 59. R1=0.036 ohm. The output filter capacitor comprises a capacitance 45 Cout=22 microfarad and an equivalent series resistance 47 Resr=1 milliohm. Resistors Rin, Rout and Rmin are, respectively, equal to 50 Kohms, 50 Kohms and 2000 Kohms. The gains of current-to-current converters F1a, F1b, F2a, F2b and F3 are respectively, 1, 1, 1,∕1;2 and 1 Capacitors C1, C2 and C3 are each 50 pF. The non-inverting input of error amplifier A1 is connected to a 1.25 Volt reference voltage source. Resistors Rv1 69 and Rv2 77, of values 53.75 Kohms and 1.25 Kohms, respectively, deliver a fraction of the output voltage of the converter to the inverting input of amplifier A1 via the FB input terminal 58 of the switch controller 41. A 20 picofarad integrating capacitor connects between the output and inverting input of amplifier A1. Amplifier A1 has an open-loop gain of 100 and very wide bandwidth. The voltage divider, comprising resistors Rv1 and Rv2, and amplifier A1 form part of a closed negative feedback loop which is used to regulate the output voltage of the converter. The voltage, Verr, delivered at the output of amplifier A1 automatically adjusts to maintain the converter output voltage in regulation as input voltage and load vary.

With reference to FIGS. 15, 16 and 17, at time t=to, switches S1 and S4 are both ON and current $I_L$ is ramping up in inductor L1 during the Input Phase of the converter operating cycle. During this time period the Q outputs of flip-flops SR1 and SR2 are low, output switches 80, 82 are open and capacitors C1 and C2 are being charged by currents I1 and I2, respectively, and the outputs of flip-flops SR3 and SR4 are high, enabling switches S4 and S1 and disabling switch S2 (via buffers B2 and B1, which deliver drive signals to the gates of switches S4, S1 and S2 via switch controller terminals Q1 51 and Q4 54 and the additional gate interface and gate drive circuitry connected between terminal Q1 and the gates of switches S1 and S2, as shown in FIG. 15). During this period the voltage Vst, delivered at the output of AND gate U8, is also low, causing output switch 84 to also be open and enabling charging of capacitor C3. With the converter operating under steady state conditions, the error voltage, Verr, delivered at the output of amplifier A1, is modulated in proximity of an average value, Verr1, sufficient to maintain the converter output voltage at 54.5 VDC. At time t=t1 the voltage across capacitor C2 rises to equal Verr1 and the output of comparator TC2 goes high. A short time later (as simulated by 10 nanosecond delay circuit DC2) the high output of comparator TC2 propagates to both the S input of flip-flop SR2, setting it and causing capacitor C2 to be discharged, and to the R input of flip-flop SR3, resetting it and causing the output of buffer B2 to go low, which turns switch S4 off via terminal Q4.

During the Input Phase the polarity of the voltage across switch S3 cause switch 64 in active rectifier circuit 60 to be OFF and switch 65 in active rectifier circuit 62 to be ON holding switch S3 OFF. Between times t1 and t2 (FIG. 17), the voltage across switch S4 rises and at time t2, the polarity of the voltage across switch S3 changes as the voltage across the switch passes through zero volts. The active rectifier circuits 60, 62 sense the change in the polarity of the voltage across S3 and apply drive voltage to the gate of S3 to turn S3 ON shortly after time t2.

Between times t2 and t3, during the In-Out Phase, switches S1 and S3 are ON and switches S2 and S4 are OFF. Because Vin is very close in value to Vout, the current I1 is relatively small (see equation (1), above) and the duration of the In-Out Phase is relatively long, as shown in FIG. 17. A short time prior to time t3 the voltage across capacitor C1 rises to equal Veff1 and the output of comparator TC1 goes high. A short time later (as simulated by 10 nanosecond delay circuit DC1) the high output of comparator TC1 propagates to both the S input of flip-flop SR1, setting it and causing comparator C1 to be discharged, and to the R input of flip-flop SR4, resetting it and causing the output of buffer B1 to go low, which brings the voltage at terminal Q1 low. When the voltage at terminal Q1 goes low, the output of buffer 61 goes low and the output of buffer 63 goes high. The voltage at gate of switch S1 is brought low via buffer 61 and diode 72, causing the gate voltage to pass through its threshold value relatively quickly, causing S1 to turn OFF at time t3. The turn-on of switch S2 is delayed relative to the turning OFF of switch S1, however, owing to resistor Rf 75 (of value 30 ohms), which acts in concert with the gate capacitance of S2 (not shown) to slow the rise in voltage at the gate of S2, causing it to turn ON at time t4. The value of resistor Rf 75 is selected so that the voltage V1, across switch S2, will be discharged to approximately zero volts (by the positive flow of current $I_L$) between times t3 and t4 (the ZVS S2 Phase).

Between times t4 and t5, during the Freewheel Phase, switches S2 and S3 are ON and the current $I_L$ declines in inductor 43. A short time prior to time t5 the current in switch S3 crosses through zero and becomes negative, the voltage across S3 reverses and the active rectifiers 60, 62 discharge the gate of S3, causing it to turn OFF at time t5. During the ZVS S4 Phase following time t5, the reversed flow of current $I_L$ discharges the voltage V2, across switch S4, toward zero volts. The voltage V2 is delivered to the inverting input of comparator TC4 via terminal Q4s of switch controller 41. The non-inverting input of comparator TC4 is connected to a 5 volt reference voltage. When V2 drops below 5 volts the output of comparator TC4 goes high, triggering mono-stable pulse generator MM1 to deliver a single 15 nanosecond pulse at its Q output; setting the Q output of flip-flop SR3 to its high state; and delivering a signal to the gate of S4, via buffer B2 and terminal Q4, to turn switch S4 ON a short time later, at time t6. When the output of comparator TC4 goes high, it also enables a first input 86 of AND gate U8. If the second input 88 to AND gate U8 is high when the output of comparator TC4 goes light (as discussed below), the output of AND gate U8 will go high essentially at the same time that TC4 goes high, resetting flip-flops SR2 and SR1, setting flip-flop SR4 and causing the voltage at the output of buffer B1 (at terminal Q1 51) to go high. The high output of B1 will result in switch S2 being turned OFF relatively quickly, via buffer 63 and diode 73 at time t7. The turn-on of switch S1 is delayed relative to the turning OFF of switch S2 however, owing to resistor Ru 74 (of value 8 ohms), which acts in concert with the gale Capacitance of S1 (not shown) to slow the rise in voltage at the gate of S1, causing it to turn ON at time to +T. The value of resistor Ru 74 is selected so that the voltage across switch S1 will be discharged to approximately zero volts (by the negative flow of current $I_L$) between times t7 and to +T (the ZVS S1 Phase). The turning ON of switch S1 begins another operating cycle, as described above.

As noted earlier, converter operating frequency will increase with an increase in input voltage: with an increase in the difference between the input and output voltage; and with decreasing load. Timer M3 limits the maximum operating frequency of the converter by setting a lower limit on the operating period. As noted above, each time the output of AND gate U8 goes high, the output switches 80, 82, 84 across timing capacitors C1, C2 and C3 are opened, causing the capacitors to begin charging. If I3 is sufficiently large relative to I1, as is the case in the example of FIG. 17, capacitor C3 will charge to 5 volts and the second input of AND gate U8 will be driven high (via the output of delay circuit DC3 and comparator TC3), prior to the first input of AND gate U8 being driven high (prior to time t6). Under this circumstance, the Clamped Phase, between times t6 and t7 will have a very short duration determined by circuit propagation delays and the relative values of the times needed to charge and discharge the gate capacitances of switches S4 and S2 with respect to their gate threshold voltages. If, however, conditions are such that the first input 86 to AND gate U8 is enabled prior to the timeout of timer M3 (i.e. the output of DC3 goes high), the transition of the output of AND gate U8 to its high state will be delayed until DC3 goes high. This will result in an increased delay between time t6, at which switch S4 is turned ON in response to the high-going output of TC4, and time t7, at which S2 is turned OFF. In other words, the Clamped Phase will be increased as a means of preventing the operating period from dropping below the mini mum value set by timer M3 in response to current I3.

With reference to the preceding discussion, we note that the current I1 and timer M1 set the length of time that switch S1 is ON, the current I2 and timer M2 set the time that switch S4 is ON, and the current I3 and timer M3 set the minimum operating period of the converter. The Input Phase corresponds closely to the time that S4 and S1 are both ON (timer M2); the In-Out Phase corresponds closely to the time during which S1 is ON and S4 is OFF (timer M1 minus timer M2). With reference to Equations (1), (2) and (3), above, we note that the current I2 varies in proportion to Vin and therefore the time period of timer M2 will vary inversely with Vin. Likewise, the time period of timer M1 will increase as the absolute value of (Vin−Vout) decreases and will decrease as the absolute value of (Vin–Vout) increases. The durations of timers M1 and M2 will also vary an response to changes in the load applied to the output voltage owing to fact that the threshold voltage at the inverting inputs of comparators TC1 and TC2 is the output, Verr, of error amplifier A1. Thus, the time periods of timers M1 and M2 will increase as the output voltage, in response to an increase in load, drops below its setpoint value (as defined by the 1.25 VDC reference voltage source connected to the non-inverting input of amplifier AR1 and the values of divider resistors 69, 77) and will decrease as the output voltage in response to a decrease in load, increases above its setpoint value. This control strategy, along with the use of a timer to set a minimum operating period, is in accordance with the 5 elements of a control strategy discussed above. For a constant converter output voltage, Vout, the duration of timer M3 will be essentially constant, owing to the fact that the current I3 is proportional to Vout.

Figure 18:
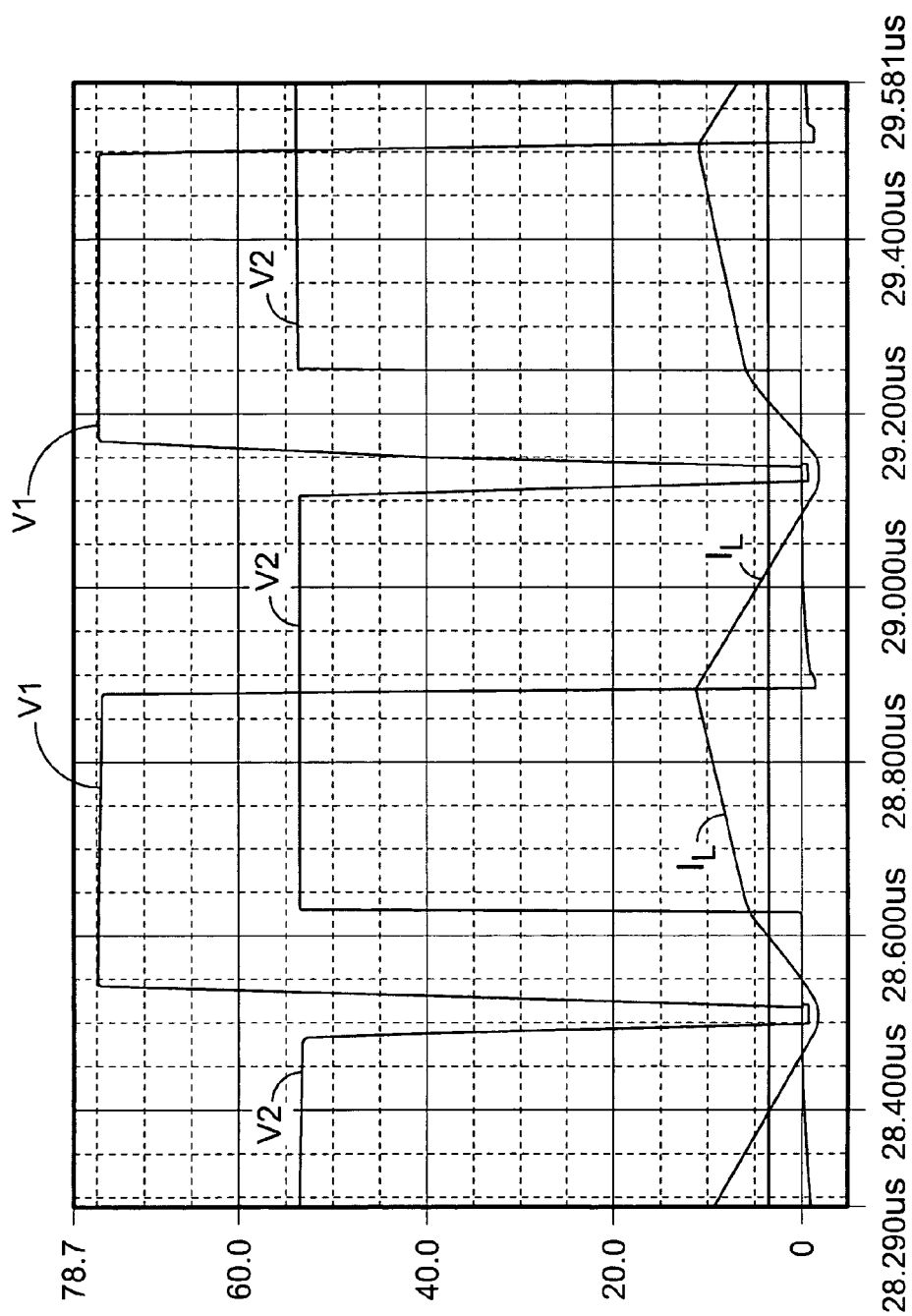
Figure 19:
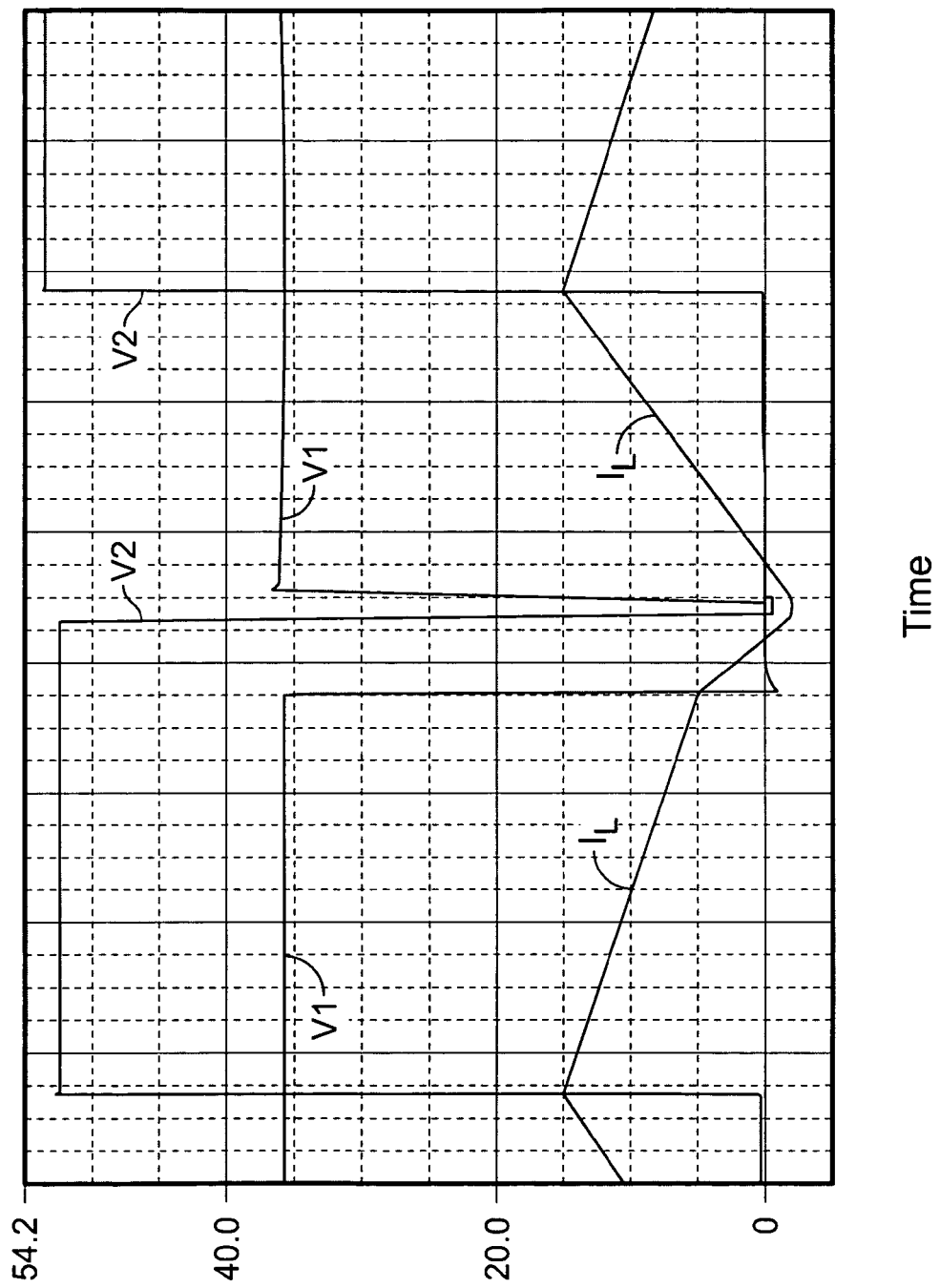
Figure 20:
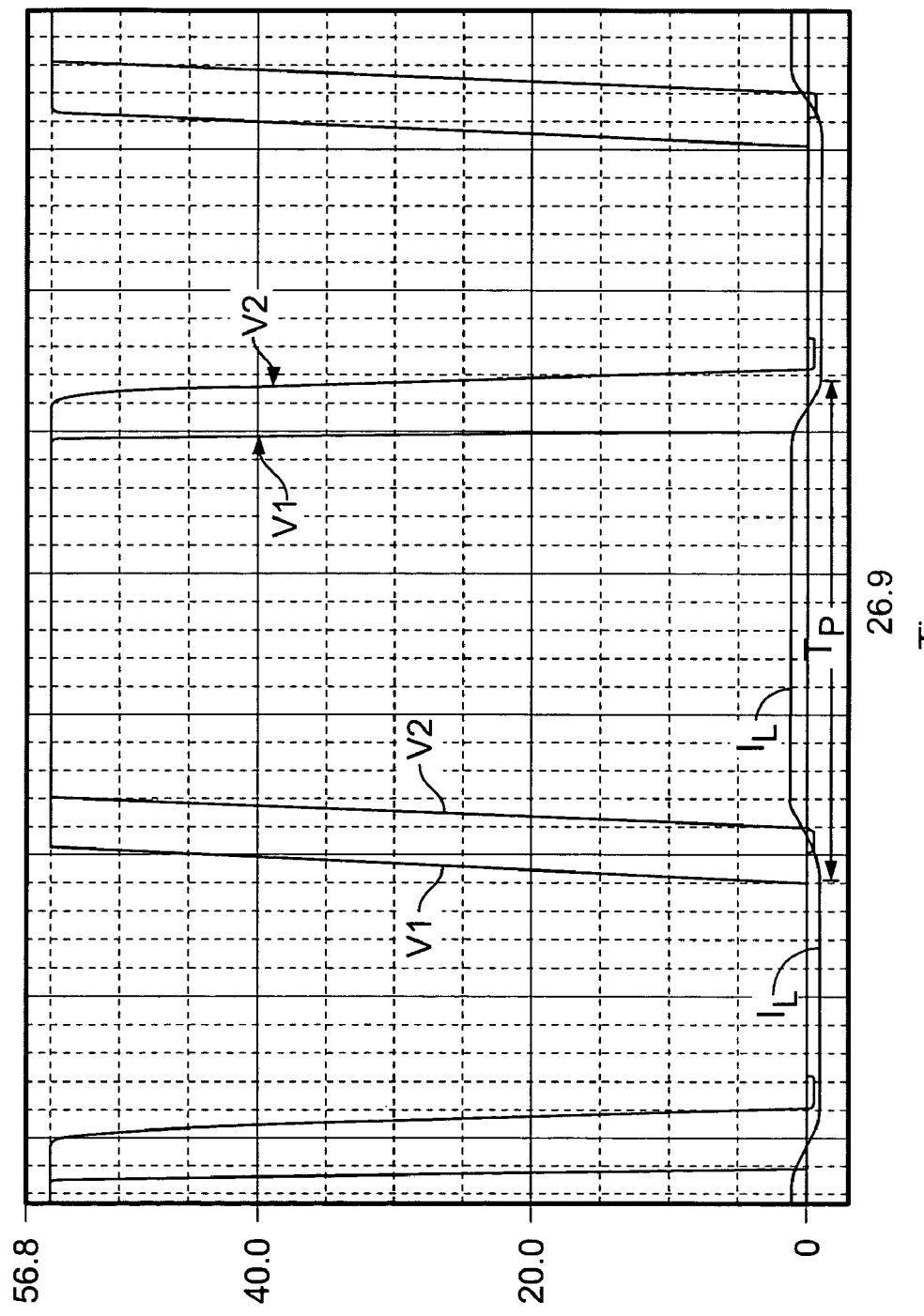
Figure 21:
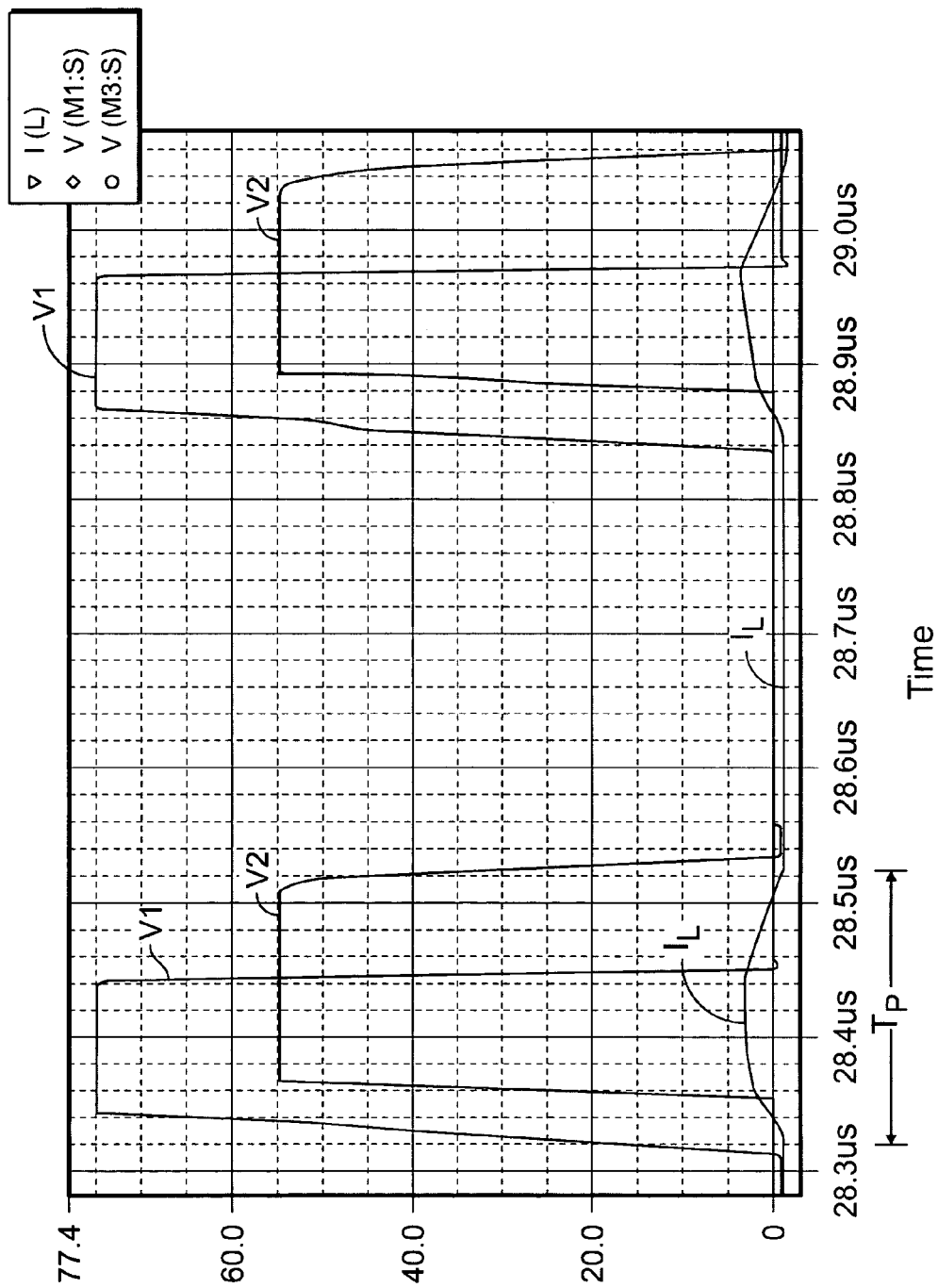
Figure 22:
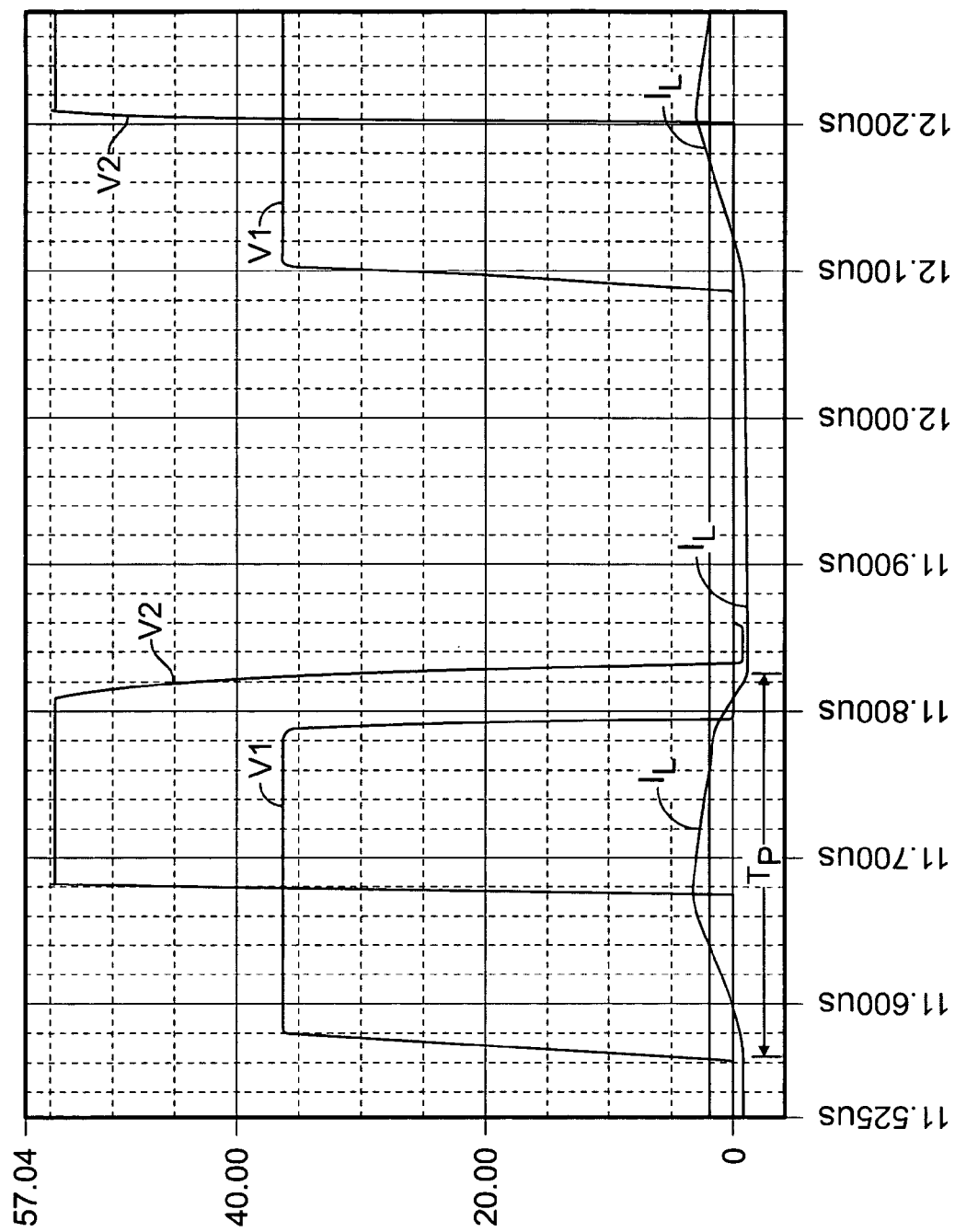

FIGS. 18 through 22 show simulated waveforms for the converter of FIGS. 15 and 16 under different operating conditions. All component values are the same as those described above and in all cases the output voltage is 54.5 VDC. FIGS. 18 and 19 show waveforms with Vin=75 VDC and Vin=35 VDC, respectively, each with Rload=10 ohms (output power equals 297 Watts); FIGS. 20, 21 and 22 show waveforms with Vin=55 VDC, Vin=75 VDC and Vin=35 VDC, respectively, each with Rload=100 ohms output power equals 29.7 Watts). The converter operating periods in FIGS. 17 through 19 are, approximately, 2.0, 0.6 and 1.2 microseconds, respectively; the converter operating period is essentially the same in FIGS. 20 through 22 and is approximately 0.52 microsecond.

FIGS. 17, 18 and 19, in which the converter delivers a relatively high output power, illustrate the following: (1) when the input voltage is close to the output voltage, as in FIG. 17, the converter operating period is increased (2 microsec) and the In-Out Phase, in which power is transferred directly from input to output, constitutes the bulk of the operating period; (2) the converter operating period decreases as the difference between the input voltage and output voltage increases (FIGS. 17, 19); (3) the In-Out Phase constitutes a relatively larger fraction of the total converter operating period when the converter operates in a boost mode, with Vin less than Vout (FIG. 19) and constitutes a relatively smaller fraction of the total converter operating period when the converter operates in a buck mode, with Vout less than Vin (FIG. 18); (4) in all cases the Clamped Phase is minimized owing to the fact that the operating period of the converter, as established by the M1 and M2 timers and the self-regulated length of the Freewheel Phase, is always greater than the minimum operating period established by the M3 timer.

FIGS. 20 through 22, in which the converter delivers a relatively low output power show the effect of the timer M3 on operating period. In all cases the operating period of the converter is fixed at 0.52 microseconds and in all cases the Clamped Phase is a significant portion of the converter operating period. In all Figures, the period encompassing the rise and fall of the current $I_L$, from the initiation of the Input Phase to the completion of the Freewheel Phase, and shown in each figure as the approximate time period Tp, is a small fraction of the minimum operating period, Tmin.

The buck-boost converter described above delivers high levels of power density, efficiency and low noise. By virtue of Zero Voltage Switching at each switch transition, switching losses and switch conduction losses are virtually eliminated, enabling higher frequency operation and, consequently, higher power density without a compromise in efficiency. Inductor 43 has relatively small inductance and can be made small in view of the favorable ratio of rms to average current and the low amplitude of harmonic components of the current at, or above, the switching frequency as compared to the DC component. In particular, looking at FIG. 17, where the input voltage is close to the output voltage, it can be seen that the inductor current is essentially constant and equal to the average load current for most of the operating cycle. The relatively low amplitude of high frequency harmonic components of the current makes inductor winding losses due to skin and proximity effects quite low, relative to typical buck or boost converters operating in discontinuous mode. For the same reason, core losses due to the AC flux in the inductor core are quite low. While inductor losses increase as the input voltage rises substantially above or below the output voltage, they are still lower than converters with a comparable maximum-to-minimum input voltage ratio.

Specifically, peak full load efficiency of the buck-boost converter described above may exceed 97% with a power density in excess of 200 Watts/cubic inch (or, utilizing advanced packaging techniques, as described in the '481 application, in excess of 500 Watt/cubic inch), much beyond the figures of merit of prior-art buck or boost converters, (whose efficiencies are below 95% at power densities below 100 Watt/cubic inch), together with the ability to both buck or boost the input voltage to deliver a desired output voltage. Efficiency remains relatively high at light loads, owing to the maximum frequency stop and the retention of energy in the inductor during the Freewheel Phase. The ZVS architecture provides for low noise operation by minimizing the rate of change of current and voltage across the switches.

Figure 23A:
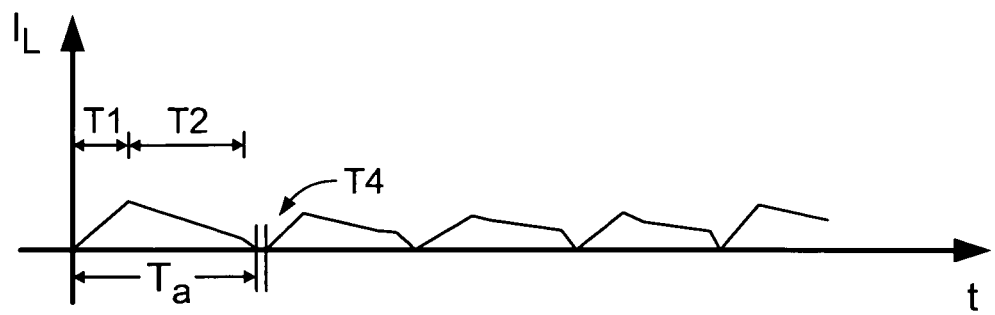
FIGS. 23A through 23C show waveforms for an idealized converter.
Figure 23B:
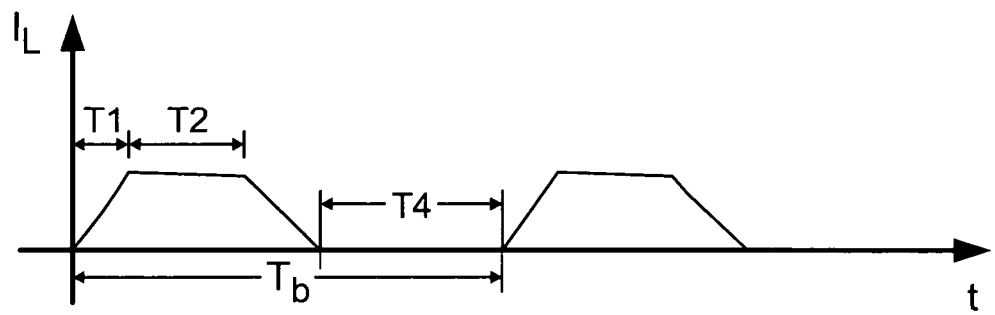
Figure 23C:
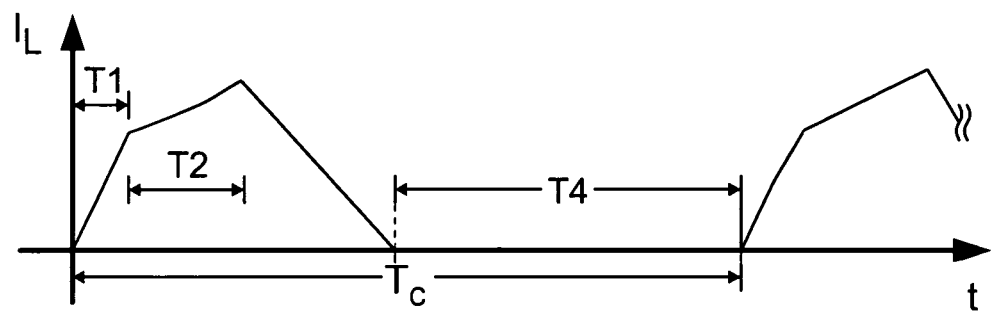

Other strategies for controlling the output voltage in an improved buck-boost converter are possible including:

1.) The lengths of the Input Phase and the In-Out Phase may be fixed and the output voltage regulated by varying the length of the Clamped Phase as a means of varying the operating frequency of the converter. This control strategy is illustrated with reference to the idealized (where the term "idealized" has the same meaning as described above and wherein the ZVS intervals in the converter are ignored) inductor current waveforms of FIGS. 23A through 23C. In FIG. 23A, the converter is delivering the desired output voltage, Vout, while operating at maximum rated load and at its minimum rated input operating voltage, Vin=Vinmin. Under these conditions, with the length of the Input Phase fixed at T1 and the length of the In-Out Phase fixed at T2, the duration, T4, of the Clamped Phase is close to zero. As the input voltage increases and/or the load decreases, the length of the Clamped Phase is increased to maintain the output voltage at the desired value. For example, FIG. 23B shows operation at full load and an input voltage which is above Vinmin, but below Vo, and FIG. 23C shows operation at full load and an input voltage which is above Vo. With an Input Phase of fixed duration, the energy transferred into the converter during each operating cycle will increase with Vin and, as a result, for a fixed power output, the length of the Clamped Phase will be increased accordingly to maintain the output voltage at a fixed value. Thus, the period, Tc in FIG. 23C is greater than the period, Tb, in FIG. 23B, which is greater than the period. Ta, in FIG. 23A.

2.) The preceding strategy may be modified by decreasing the length, T1 (FIG. 23), of the input Phase as input voltage, Vin, increases above Vinmin. This will result in a reduction in the range of frequency variation.

3.) The preceding strategy may be further modified by, in addition to decreasing the length of the Input Phase with increasing Vin, also varying the length of the In-Out Phase in inverse proportion to abs(Vin−Vout). As above, the length of the Clamped Phase is varied to control Vo. This both reduces the range of operating frequencies and also increases efficiency by increasing the length of the In-Out Phase when Vin is close in magnitude to Vo, as discussed earlier.

Figure 24A:
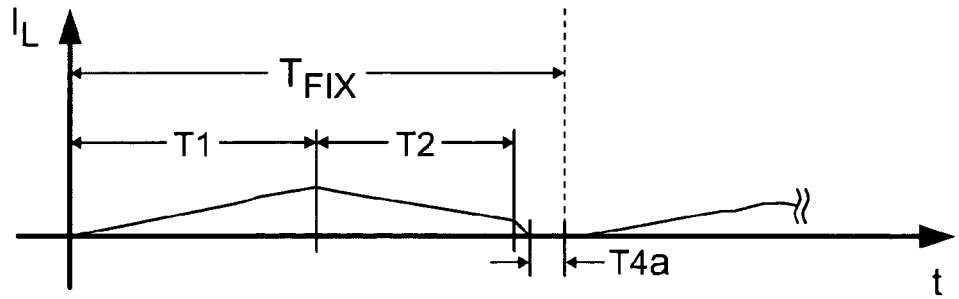
FIGS. 24A through 24C show waveforms for an idealized converter.
Figure 24B:
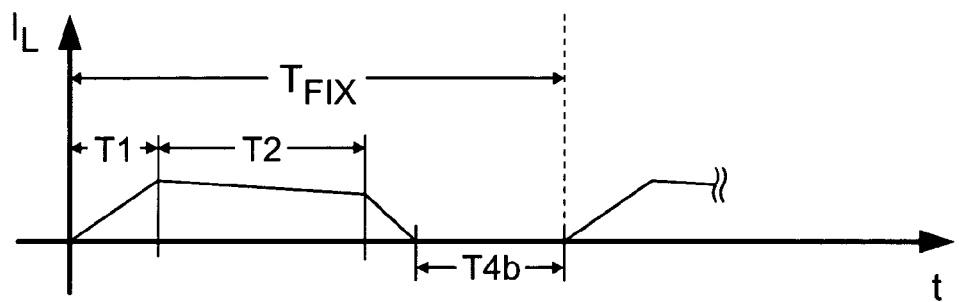
Figure 24C:
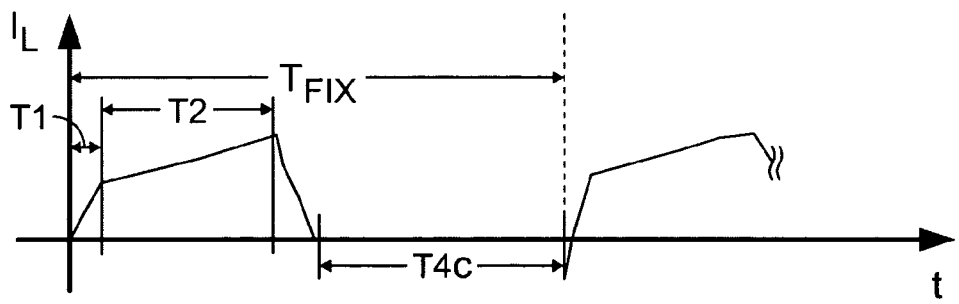
Figure 25A:
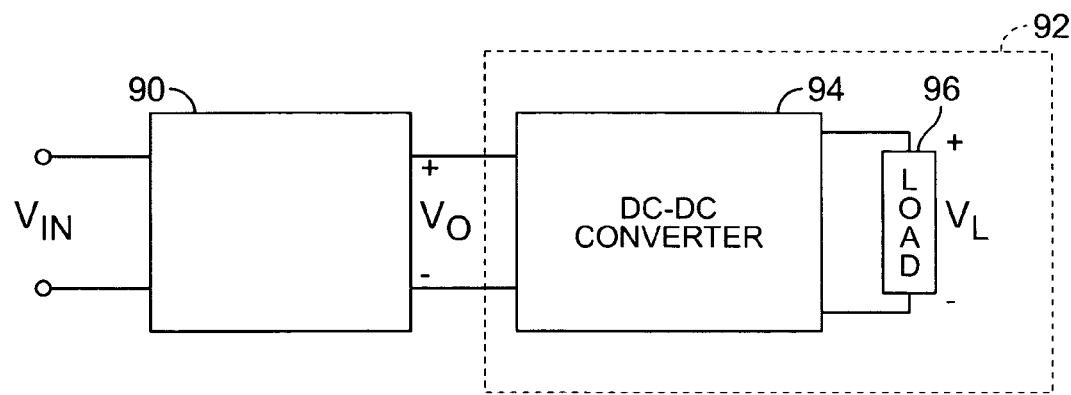
FIGS. 25A and 25B show cascaded power converters.
Figure 25B:
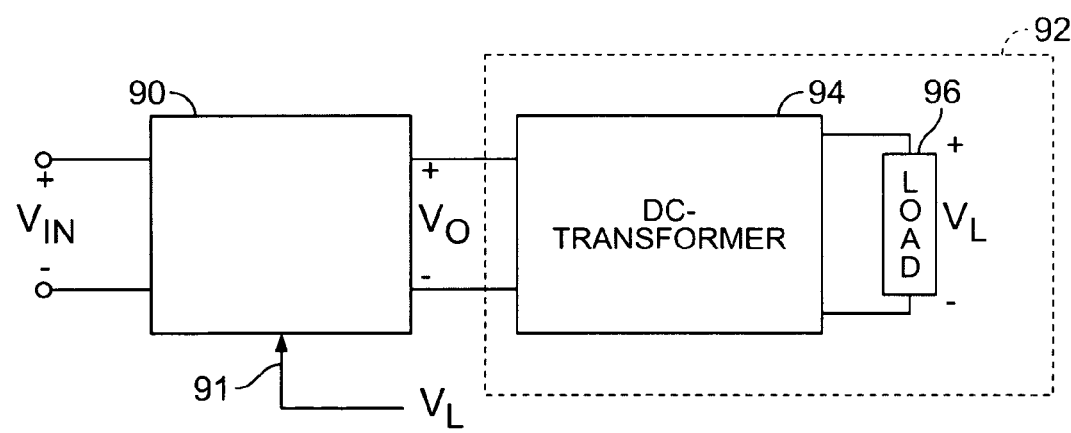

4. The converter may be operated at an essentially fixed operating frequency by fixing the length of the In-Out Phase and varying the length of the Input Phase to regulate the output voltage to a desired value, Vo. This control strategy is illustrated with reference to the idealized (where the term "idealized" has the same meaning as described above and wherein the ZVS intervals in the converter are ignored) inductor current waveforms of FIGS. 24A through 24C. In FIG. 24A, the converter is delivering the desired output voltage, Vout, while operating at a relatively low value of load power, P1, and at its minimum rated input operating voltage, Vin=Vinmin. Under these conditions the operating period of the converter, Ta, is just slightly less than the fixed operating period, $T_{FIX}$. As the input voltage and/or the load increase, the length of the Input Phase is decreased to maintain the output voltage at the desired value. For example, FIG. 24B shows operation at full load and an input voltage which is above Vinmin, but below Vo, and FIG. 24C shows operation at full load and an input voltage which is above Vo. In each case, the increased input voltage results in a decrease in the duration of the Input Phase. This, in turn, causes the Clamped Phase (T4a, T4b, T4c, FIG. 24), to increase as Vin increases. Because of the high efficiency of the converter, it may be necessary to increase the operating period of the converter above the value $T_{FIX}$ as the load power drops below some value. An example of one application of the improved buck-boost approach is shown in FIG. 25A. In the Figure an improved buck-boost converter 90 receives an input voltage Vin and delivers and output voltage, Vo, to a load 92, the load comprising a DC-DC converter 94 that delivers power to a load 96 at a voltage $V_L$. The DC-DC converter 94 may be an isolated converter that regulates the voltage $V_L$. The DC-DC-converter 94 may also be reduced to an unregulated DC-Transformer and the DC-Transformer may be cascaded with the buck-boost converter to provide a DC-DC converter. As shown in FIG. 25B, if the converter 94 is an unregulated DC-Transformer, the voltage $V_L$ may be delivered as a feedback input 91 to the buck-boost converter 90. By comparing the voltage $V_L$ to a reference voltage (not shown) and generating an error voltage based on the difference between $V_L$ and the reference voltage, the output voltage, Vo of the buck-boost converter can be varied as a means of regulating the voltage $V_L$.

In the applications of FIGS. 25A and 25B, the input source voltage, Vin, may exhibit perturbations of varying length and magnitude about a nominal value, Vinnom. In such cases, optimal efficiency in the buck-boost converter 90 may be achieved by setting the output voltage, Vo, of the buck-boost converter to be essentially equal to Vinnom.

Figure 28:
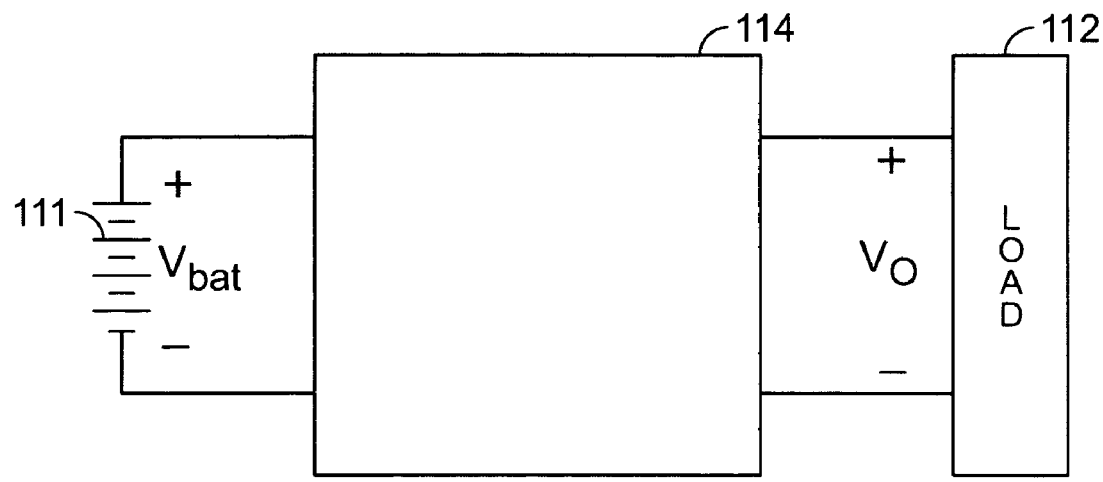
FIG. 28 shows a converter for use with a battery.

Because the improved buck-boost converter exhibits high conversion efficiency it is useful as a battery voltage regulator, as shown in FIG. 28. In the Figure, a battery 111 serves as an input source for a buck-boost converter 114 whose regulated output voltage, Vo is delivered to a load 112. If the load 112 comprises one or more efficient VTMs (e.g. of the kind described in the '481 application, referenced in the Background), the VTMs may be designed to operate from an input voltage which is close in value to the nominal value of the battery voltage, Vbat. In this way, the input and output voltages, Vbat and Vo, of the buck-boost converter 114 will be close in value and the converter may, as discussed above, exhibit very high levels of conversion efficiency, such as, for example a conversion efficiency greater than 97%.

Figure 26:
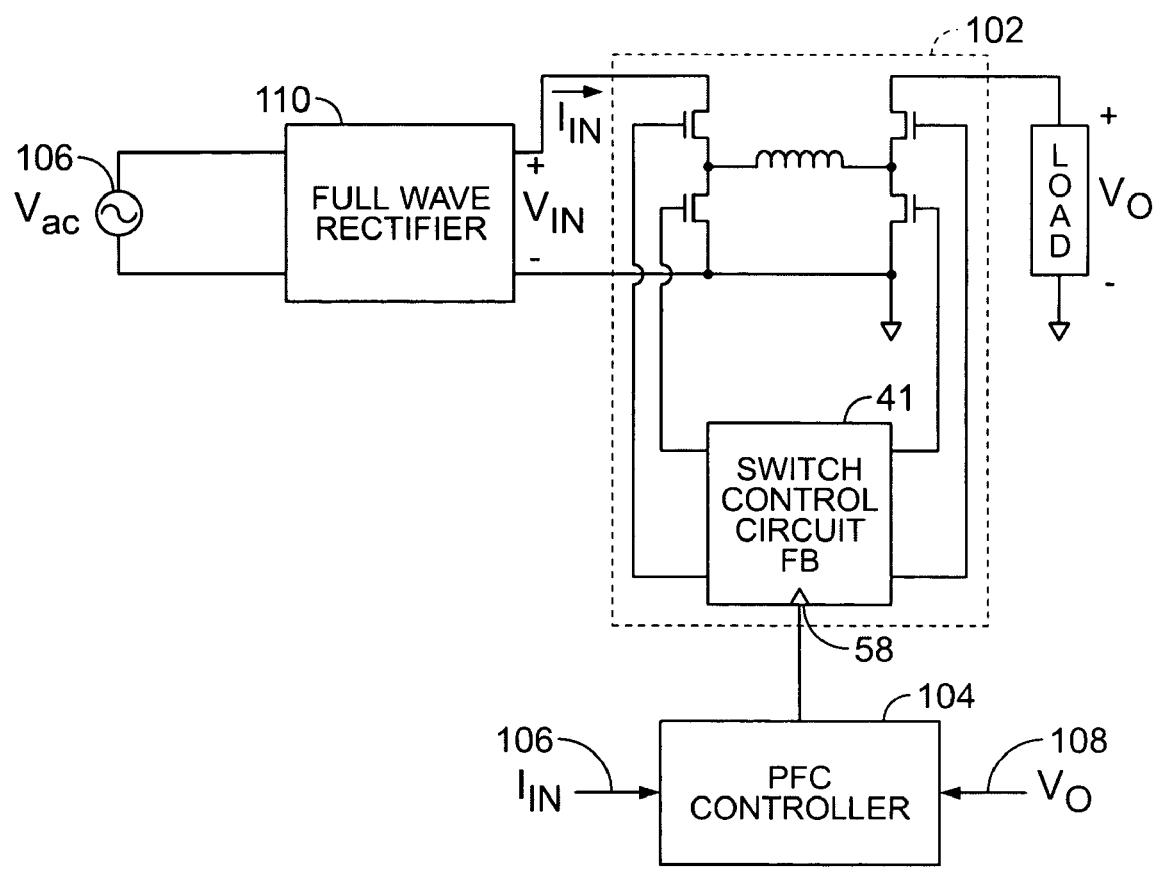
FIG. 26 shows a power-factor-correcting converter.

The improved buck-boost converter may also be applied as a "power-factor-correcting"converter, which accepts an AC utility voltage input and delivers a DC output for powering a load (which may comprise regulating DC-DC converters) and which does so while controlling the current drawn from the AC source as a means of controlling the harmonic content of the current. Prior art power-factor-correcting converters are described, e.g. in L. H. Dixon, "High Power Factor Preregulator for Off-Line Supplies," Unitrode Power Supply Design Seminar Manual SEM600, 1988, published by Unitrode Corporation, Merrimack, N.H., a subsidiary of Texas Instruments, Inc. FIG. 26 shows a power-factor-correcting converter comprising a buck-boost converter 102 of the kind shown in FIGS. 15 and 16. In the Figure, an AC voltage, Vac, delivered by AC source 106 is rectified by full-wave rectifier 110 and delivered as the input voltage, Vin, to the buck-boost converter 102. PFC controller 104 accepts an input 106, indicative of the time varying magnitude of the rectified input current, Iin, and an input 108, indicative of the DC output voltage, Vo, of the buck-boost converter 102. The PFC controller delivers a signal to the FB input terminal 58 of the switch controller 41 (as described above with reference to FIGS. 15 and 16) to control the waveform of Iin so as to simultaneously control the harmonic content of the current drawn from the AC source while regulating the output voltage at some desired value, Vo.

Figure 29:
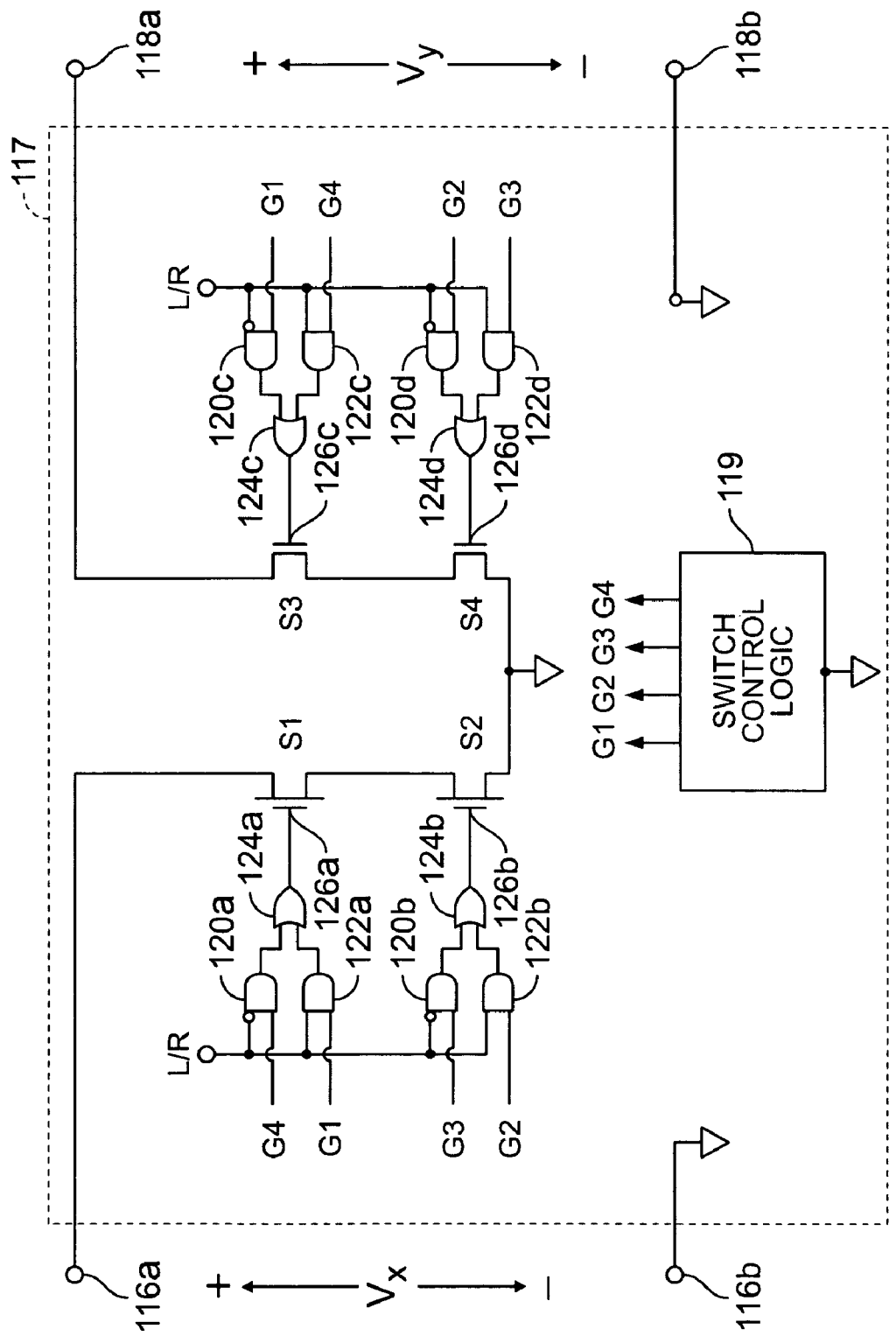
FIG. 29 shows a bi-directional power converter.

FIG. 29 shows another improved buck-boost converter 117 comprising four MOSFET switches, S1 through S4 and switch control circuitry 119. The input-to-output symmetry of the switches in such a converter allows it to be operated in a bi-directional mode: power may either be processed from "left-to-right", e.g., from an input source of voltage Vx connected to terminals 116a, 116, and delivered to a load, connected to terminals 118a, 118b, at a voltage Vy; or power may be processed from "right-to-left", e.g. from an input source of voltage Vy, connected to terminals 118a, 118b, and delivered to a load, connected to terminals 116a, 116b, at a voltage Vx. In such a converter the switch control circuitry 119 may comprise any of the switch control circuits described above, such as, for example, those described with reference to FIGS. 3 and 15. The control signals, G1 through G4, delivered by the control logic 119, correspond to the switch control signals delivered to switches S1 through S4, respectively, in the examples of FIGS. 3 and 15. The bi-directional converter of FIG. 29 also comprises steering logic, comprising AND gates 120a–120d, AND gates 122a–22d, and OR gates 124a–124d. With reference to FIG. 29, if power is to be processed from "left-to-right"the L/R signal will be high and the MOSFET switch gate control inputs 126a through 126d, will receive signals G1 through G4, respectively. In this mode the operation of switches S1 through S4 will be the same as described above in the examples of FIGS. 3 and 15. If, however, the L/R signal is low, the roles of switch pairs S1/S2 and S3/S4 will be reversed: control signals G1 and G2 will be delivered to switches S3 and S4, respectively, and control signals G3 and G4 will be delivered to switches S1 and S2, respectively. In this way the roles of switches S1 and S3 are reversed relative to their roles in the examples of FIGS. 3 and 15, as are the roles of switches S2 and S4 and power is processed from "right-to-left."

Figure 30:
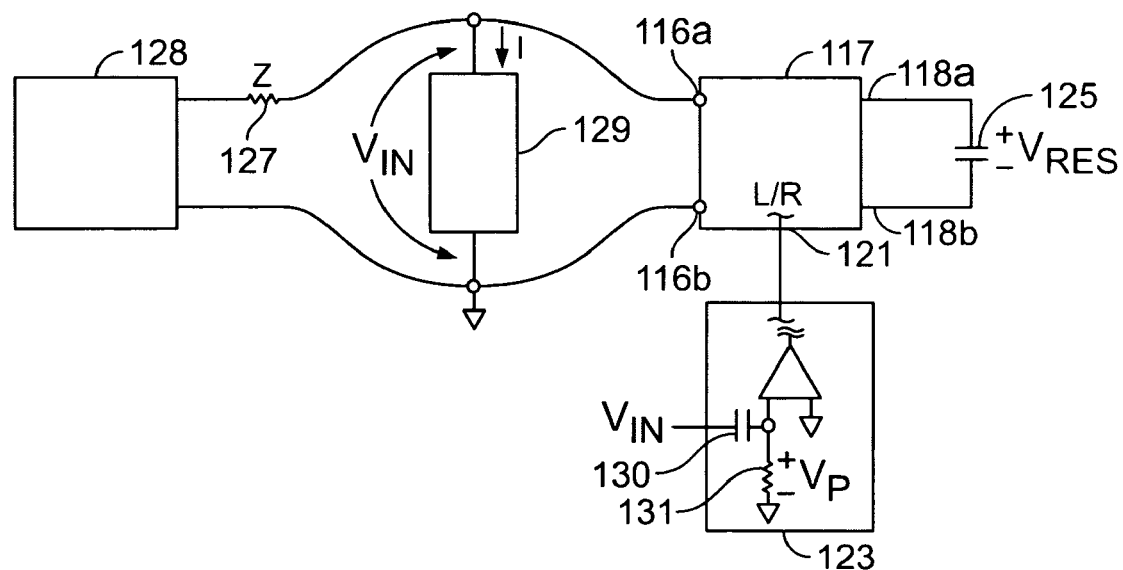
FIG. 30 shows a circuit comprising an active filter.

FIG. 30 illustrates a bi-directional converter 117, of the kind shown in FIG. 29, applied as an active filter to control the voltage across a circuit element 129 under transient conditions. In the Figure, power is delivered to the circuit element 129 by power source 128, which regulates the average value of the voltage across the circuit element, $V_W$. If the current I, drawn by the circuit element increases or decreases rapidly, the voltage across the circuit element, $V_W$, may exhibit transient variations resulting, for example, from the effects of source impedance 127 or the transient response time of the source. Thus. $V_W=V_{DC}+V_P$, where $V_{DC}$ is the average value and $V_P$ is the transient variations. The transient variations, $V_P$, may be reduced by connecting one set of terminals 116a, 166b of a bi-directional buck-boost converter 117 across the circuit element and connecting the other set of terminals 118a, 118b to a storage capacitor 125. Routing control circuitry 123 includes circuitry (e.g., as illustrated in the figure by capacitor 130 and resistor 131) that removes the average value, $V_{DC}$, from the voltage $V_W$ to deliver the voltage $V_P$. If the voltage $V_P$ goes negative, indicating that the instantaneous value of $V_W$ is below $V_{DC}$, the routing control circuitry will drive the L/R signal 121 low. The switch control circuitry (not shown) in the bi-directional converter 117 will respond to the low L/R signal by delivering energy from the storage capacitor 125 to terminals 116a, 116b in order to maintain the voltage across the circuit element at the value $V_{DC}$. If the voltage $V_P$ goes positive, indicating that the instantaneous value of $V_W$ is above $V_{DC}$, the routing circuitry will drive the L/R signal 121 high. The switch control circuitry in the bi-directional converter 117 will respond to the high L/R signal by transferring energy from terminals 116a, 116b to the storage capacitor 125 so as to maintain the voltage across the circuit element at the value $V_{DC}$.

Figure 27:
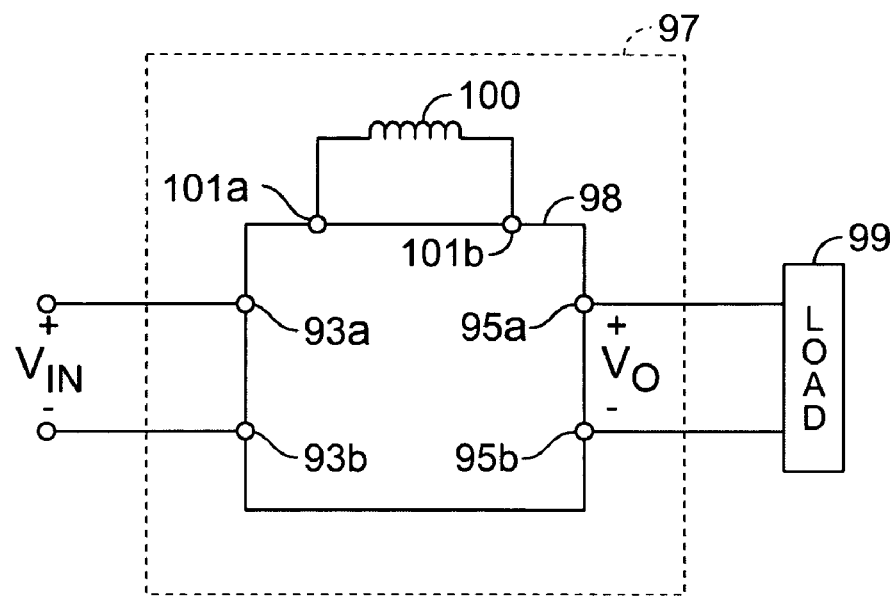
FIG. 27 shows a buck-boost converter comprising an integrated semiconductor device.

As shown in FIG. 27, an improved buck-boost converter 97 may be embodied in the form of an integrated semiconductor device 98 comprising input terminals 93a, 93b, for connecting an input source to the converter; output terminals 95a, 95b, for connecting a load 99 to the converter; and inductor terminals 101a, 101b, for connecting an inductor 100 to the converter. The integrated semiconductor device 98 comprises all of the switches and switch control circuitry described above; the external inductor is connected to the integrated semiconductor device 98 to form a complete buck-boost converter. The integrated semiconductor device 98 may be, for example, a self-contained semiconductor integrated circuit or a hybrid circuit comprising semiconductor integrated circuit die and other circuit components mounted to a substrate.

Improved buck-boost converters may be adapted to share power with similar buck-boost converters in an array of paralleled converters in order to provide power to a load at a power level exceeding the rated maximum power rating of a single buck-boost converter. Improved buck-boost converters may also be configured into a parallel array in order to provide fault tolerant delivery of the voltage required by a load in the event of failure of an individual converter within the array. Whereas converters may be paralleled in power sharing configurations by sensing the output current of each converter and forcing output currents to track each other, such closed loop paralleling architectures are prone to loop instabilities and to single point failure modes that deprive the array of the desired fault tolerant attributes. Open loop power sharing architectures that circumvent these drawbacks have been known to be applicable to Zero Current Switching (ZCS) converters, as described in Vinciarelli, U.S. Pat. No. 5,079,686, "Enhancement-mode zero-current switching converter", issued Jan. 7, 1992 (the '686 patent) and incorporated herein in its entirety by reference, or to frequency modulated converters whose energy per pulse unlike that of PWM converters, is determined by input and output voltage and by constraints in the time domain, such as Zero Current Switching.

Improved buck-boost converters operating in discontinuous current mode may be adapted to power share by incorporating an input-output port to emit and receive a paralleling pulse via a paralleling bus so as to lock the frequency of a succession of power conversion cycles and control the energy per power conversion cycle to be the same among paralleled converters within an array. If the control algorithm of the improved buck-boost converter defines the energy per pulse as a function of input voltage, output voltage and frequency but independently of load, the power sharing protocol may rely on a paralleling input-output port interface for a train of pulses whose leading edge is used to lock the frequency of the power conversion cycles of the paralleled converters. If, on the other end, the energy per pulse is also dependent on load, then the power sharing protocol needs to provide open loop communication of that dependency. This may be achieved by utilizing the falling edge, or width of the pulses in the pulse train to adjust parameters of the power conversion cycle that determine its As an example, the leading edge of the paralleling pulse may be synchronized to the start of the Input Phase and the falling edge of the same pulse may be synchronized to the start of the Input-Output Phase. If, for a given input and output voltage, the control algorithm of the improved buck-boost converter is such that the energy per power conversion cycle is essentially determined by the duration of the Input Phase, then converters sharing the same input voltage, output voltage, operating frequency and Input Phase duration will also share, in pre-defined proportions, the total power delivered to the load. Thus improved buck-boost converters may also provide cost-effective, inherently stable and fault tolerant power sharing among converter modules, or PRMs, within a paralleled array. A further advantage of this paralleling protocol is the avoidance of noise due to "beat frequencies" among incoherent converters operating at similar, yet different, frequencies.

Other embodiments are also within the scope of the following claims.

The invention claimed is:

1. Apparatus for converting power from an input source at an input voltage for delivery to an output at an output voltage, comprising:
   first and second switches adapted to be connected to a first terminal of an inductor and a third switch adapted to be connected to a second terminal of the inductor,
   a switch controller adapted to operate the switches in a series of converter operating cycles, each converter operating cycle including,
   (i) an input ("IN") phase during which the inductor is connected across the source for a time $T_{IN}$,
   (ii) a input-output ("IO") phase during which the inductor is connected between the source and the output for a time $T_{IO}$,
   (iii) a free-wheel ("FW") phase during which the inductor is connected across the output for a time $T_{FW}$,
   (iv) a clamp ("CL") phase during which the inductor is shorted for a time $T_{CL}$,
   wherein the end of each converter operating cycle marks the beginning of another converter operating cycle.

2. The apparatus of claim 1 wherein each converter operating cycle comprises a sequence in which the IN phase occurs before the IO phase, the IO phase occurs before the FW phase, and the FW phase occurs before the CL phase.

3. The apparatus of claim 2 wherein the switch controller is adapted to adjust the duration of $T_{IN}$, $T_{IO}$, $T_{FW}$, or $T_{CL}$.

4. The apparatus of claim 3 wherein each converter operating cycle comprises an energy recycling interval following at least one of the IN, IO, FW, or CL phases.

5. The apparatus of claim 1 or 4 wherein each converter operating cycle further comprises:
 a first energy recycling interval following the IN phase,
 a second energy recycling interval following the IO phase,
 a third energy recycling interval following the FW phase, and
 a fourth energy recycling interval following the CL phase,
 wherein a parasitic capacitance of a selected switch is charged or discharged using current flowing in the inductor.

6. The apparatus of claim 2 further comprising a unidirectional conduction device connected to the second terminal.

7. The apparatus of claim 6 wherein the unidirectional conduction device is connected between the second terminal and the load.

8. The apparatus of claim 2 further comprising a fourth switch adapted to be connected to the second terminal.

9. The apparatus of claim 8 wherein the fourth switch is connected between the second terminal and the load.

10. The apparatus of claim 2 or 8 wherein the switches comprise MOSFETs.

11. Apparatus comprising a buck-boost power converter comprising the apparatus of claim 1 wherein the input source is an AC source, and further comprising a power factor controller connected to the switch controller to cause the switch controller to control the harmonic content of an input current from the AC source while regulating the output voltage.

12. The apparatus of claim 11 wherein the power factor controller senses the output voltage and the input voltage.

13. The apparatus of claim 1 wherein the input source comprises a battery.

14. The apparatus of claim 1 further comprising:
 a paralleling port to emit or receive from a paralleling bus a paralleling pulse in a series of paralleling pulses, and
 a control circuit to synchronize the series of converter operating cycles to the series of paralleling pulses;
 wherein the apparatus is adapted to share power.

15. The apparatus of claim 14 wherein the paralleling pulse has a rising edge, a falling edge and a pulse width and the control circuit adjusts parameters of the converter operating cycle in response to parameters of the paralleling pulse.

16. The apparatus of claim 1 wherein each converter operating cycle further comprises:
 a first energy recycling interval following the IN phase,
 a second energy recycling interval following the IO phase,
 a third energy recycling interval following the FW phase, and
 a fourth energy recycling interval following the CL phase,
 wherein a parasitic capacitance of a selected switch is charged or discharged using current flowing in the inductor.

17. Apparatus for converting power from an input source at an input voltage for delivery to an output at an output voltage, comprising:
 first and second switches adapted to be connected to a first terminal of an inductor and a third switch adapted to be connected to a second terminal of the inductor,
 a switch controller adapted to operate the switches in a series of converter operating cycles, each converter operating cycle including:
  (i) an input ("IN") phase during which the inductor is connected across the source for a time $T_{IN}$,
  (ii) a input-output ("IO") phase during which the inductor is connected between the source and the output for a time $T_{IO}$,
  (iii) a free-wheel ("FW") phase during which the inductor is connected across the output for a time $T_{FW}$,
 wherein each converter operating cycle includes exactly one of each of the IN, IO, and FW phases, each IN, IO, and FW phase is uninterrupted, and the end of each converter operating cycle marks the beginning of another converter operating cycle; and
 wherein the inductor is connected across the source to initiate the IN phase at a time when a negative current is flowing in the inductor.

18. The apparatus of claim 17 wherein each converter operating cycle further comprises a clamp ("CL") phase during which the inductor is shorted for a time $T_{CL}$.

19. The apparatus of claim 17 wherein each converter operating cycle comprises a sequence in which the IN phase occurs before the IO phase and the IO phase occurs before the FW phase.

20. The apparatus of claim 19 wherein the switch controller is adapted to adjust the duration of $T_{IN}$, $T_{IO}$, or $T_{FW}$.

21. The apparatus of claim 17 or 20 wherein each converter operating cycle further comprises:
 a first energy recycling interval following the IN phase,
 a second energy recycling interval following the IO phase,
 a third energy recycling interval following the FW phase, and
 a fourth energy recycling interval following the FW phase,
 wherein a parasitic capacitance of a selected switch is charged or discharged using current flowing in the inductor.

22. The apparatus of claim 17 further comprising a unidirectional conduction device connected to the second terminal.

23. The apparatus of claim 22 wherein the unidirectional conduction device is connected between the second terminal and the load.

24. The apparatus of claim 17 further comprising a fourth switch adapted to be connected to the second terminal.

25. The apparatus of claim 24 wherein the fourth switch is connected between the second terminal and the load.

26. The apparatus of claim 17 or 24 wherein the switches comprise MOSFETs.

27. The apparatus of claim 17 wherein the apparatus is integrated within an integrated semiconductor device.

28. Apparatus for converting power from an input source at an input voltage, where the input voltage may vary over a normal operating range between a minimum input voltage and a maximum input voltage, for delivery to an output at an output voltage, comprising:
 first and second switches adapted to be connected to a first terminal of an inductor and a third switch adapted to be connected to a second terminal of the inductor,
 a switch controller adapted to operate the switches in a series of converter operating cycles, each converter operating cycle including:
  (i) an input ("IN") phase during which the inductor is connected across the source for a time $T_{IN}$, (ii) a input-output ("IO") phase during which the inductor is connected between the source and the output for a time $T_{IO}$, (iii) a free-wheel ("FW") phase during which the inductor is connected across the output for a time $T_{FW}$, wherein, throughout the normal operating range, (a) each converter operating cycle includes exactly one of each of the IN, IO, and FW phases, (b) each IN, IO, and FW phase is uninterrupted, and (c) the end of each converter operating cycle marks the beginning of another converter operating cycle.

29. Apparatus comprising a buck-boost power conversion stage comprising the apparatus of claim 1, 17, or 28, and a DC transformer power conversion stage having an input for receiving power from the output of the buck-boost power conversion stage at the output voltage and having an output for delivering a load voltage to a load.

30. The apparatus of claim 29 wherein the DC transformer power conversion stage is incorporated in a VTM, the buck-boost power conversion stage is incorporated in a PRM, and power is delivered from the PRM to the VTM by a factorized bus.

31. The apparatus of claim 29 wherein the output of the DC transformer power conversion stage is connected in a voltage feedback configuration to control an operating condition of the buck-boost converter.

32. The apparatus of claim 1 or 31 wherein a current, $I_L$, flows in the inductor and the current returns to zero during each converter operating cycle.

33. The apparatus of claim 1 or 31 wherein a current, $I_L$, flows in the inductor and the current reverses direction during each converter operating cycle.

34. The apparatus of claim 28 wherein the minimum input voltage is less than the output voltage and the maximum input voltage is greater than the output voltage.

35. The apparatus of claim 1 or 34 wherein the inductor conducts a current having an average value over the converter operating cycle that is positive and the inductor is connected across the source to initiate the IN phase at a time when a negative current is flowing in the inductor.

36. The apparatus of claim 35 further comprising the inductor.

37. The apparatus of claim 35 wherein the apparatus is integrated within an integrated semiconductor device.

38. The apparatus of claim 1, 17, or 28 further comprising
a fourth switch adapted to be connected to the second terminal of the inductor
a first port for connection to terminals of an operating device,
a second port for connection to a storage device that stores and releases energy,
the operating device and the storage device serving respectively either as a source and a load or as a load and a source, and
a port adapted to receive a control input that controls whether power is transferred from the first port to the second port or from the second port to the first port.

39. The apparatus of claim 38 further comprising the storage device that stores and releases energy.

40. The apparatus of claim 39 wherein the storage device that stores and releases energy comprises a capacitor.

41. The apparatus of claim 1, 17, or 29, further comprising the inductor.

* * * * *

UNITED STATES PATENT AND TRADEMARK OFFICE
CERTIFICATE OF CORRECTION

PATENT NO. : 7,154,250 B2
APPLICATION NO. : 10/885827
DATED : December 26, 2006
INVENTOR(S) : Patrizio Vinciarelli It is certified that error appears in the above-identified patent and that said Letters Patent is hereby corrected as shown below:

Column 2, line 1, please delete "LTC34401" and insert --LTC3440-- therefor;

Column 6, line 57, after "FIG." insert --15.--;

Column 7, line 11, please delete "Than" and insert --than-- therefor;

Column 9, line 59, please delete "Z!S—S8 Phase" and insert --ZVS S2 Phase-- therefor;

Column 13, line 12, please delete "relined" and insert --refined-- therefor;

Column 13, line 52, please delete "VOUT" and insert --Vout-- therefor;

Column 14, line 23, please delete "1.2" and insert --T2-- therefor;

Column 15, line 1, please delete "Delivered" and insert --delivered-- therefor;

Column 15, line 30, please delete "Ib." and insert --IB,-- therefor;

Column 16, line 2, please delete "CPI. CP2" and insert --CPI, CP2-- therefor;

Column 16, line 39, please delete "1,1,1,/1;2" and insert --1,1,1,1/2-- therefor;

Column 18, line 53, please delete "mini_mum" and insert --minimum-- therefor;

Column 19, line 10, please delete "AR1" and insert --A1-- therefor;

UNITED STATES PATENT AND TRADEMARK OFFICE
CERTIFICATE OF CORRECTION

PATENT NO. : 7,154,250 B2
APPLICATION NO. : 10/885827
DATED : December 26, 2006
INVENTOR(S) : Patrizio Vinciarelli It is certified that error appears in the above-identified patent and that said Letters Patent is hereby corrected as shown below:

Column 24, line 25, after "its" please insert --energy--.

Signed and Sealed this

Twenty-sixth Day of August, 2008

JON W. DUDAS
*Director of the United States Patent and Trademark Office*